United States Patent
Schäfer et al.

(10) Patent No.: US 11,603,446 B2
(45) Date of Patent: Mar. 14, 2023

(54) TREATING POWDER COATING PAINT WASTE MATERIAL FOR RECYCLING, METHODS FOR SAME, AND USE THEREOF

(71) Applicant: Technische Universität Berlin, Berline (DE)

(72) Inventors: Konstanze Schäfer, Berlin (DE); Astrid John-Müller, Berlin (DE)

(73) Assignee: TECHNISCHE UNIVERSITAT BERLIN, Berlin (DE)

( * ) Notice: Subject to any disclaimer, the term of this patent is extended or adjusted under 35 U.S.C. 154(b) by 0 days.

(21) Appl. No.: 16/976,572

(22) PCT Filed: Mar. 4, 2019

(86) PCT No.: PCT/EP2019/055319
§ 371 (c)(1),
(2) Date: Aug. 28, 2020

(87) PCT Pub. No.: WO2019/170603
PCT Pub. Date: Sep. 12, 2019

(65) Prior Publication Data
US 2021/0047492 A1 Feb. 18, 2021

(30) Foreign Application Priority Data

Mar. 5, 2018 (DE) .................. 102018104910.2
Aug. 10, 2018 (EP) .................. 18188431

(51) Int. Cl.
*C08J 11/06* (2006.01)
*B05B 14/48* (2018.01)
(Continued)

(52) U.S. Cl.
CPC .............. *C08J 11/06* (2013.01); *B05B 14/10* (2018.02); *B05B 14/48* (2018.02); *B29C 48/022* (2019.02);
(Continued)

(58) Field of Classification Search
CPC ....... B05B 14/10; B05B 14/48; B29C 48/022; B29C 48/05; B29C 48/277; C08J 11/06; C09D 5/03; Y02P 70/10; Y02W 30/62
See application file for complete search history.

(56) References Cited

U.S. PATENT DOCUMENTS

2018/0371287 A1* 12/2018 Poole .................. C09D 167/00

FOREIGN PATENT DOCUMENTS

| CN | 105669137 A * | 6/2016 |
| DE | 4301491 C1 | 3/1994 |

(Continued)

OTHER PUBLICATIONS

Machine translation of JP-2008155167-A, Tanaka, Jul. 2008.*
(Continued)

*Primary Examiner* — Frances Tischler
(74) *Attorney, Agent, or Firm* — Blue Filament Law PLLC

(57) ABSTRACT

A method for recycling powdered paint waste is provided in which, the powdered paint waste is being treated with the aid of a reactant in such a way that its adhesion to surfaces and especially to metal surfaces is reduced or eliminated. The treatment of the powdered paint waste allows the powdered paint waste to be additionally processed under the influence of heat and to use it as a starting material in various recycling processes or in other processes.

17 Claims, 16 Drawing Sheets

(51) Int. Cl.
  *B05B 14/10*   (2018.01)
  *B29C 48/00*   (2019.01)
  *B29C 48/275*  (2019.01)
  *B29C 48/05*   (2019.01)
  *C09D 5/03*    (2006.01)

(52) U.S. Cl.
  CPC ............ *B29C 48/05* (2019.02); *B29C 48/277* (2019.02); *C09D 5/03* (2013.01)

(56) References Cited

FOREIGN PATENT DOCUMENTS

| EP | 0376020 A2 | | 7/1990 |
|----|------------|---|--------|
| JP | 2008155167 A | * | 7/2008 |
| WO | 9947318 A1 | | 9/1999 |
| WO | 2016044938 A1 | | 3/2016 |

OTHER PUBLICATIONS

Machine translation of EP-0376020-A2, Mendler, Jul. 1990.*
Machine translation of CN-105669137-A, Zhou, Jun. 2016.*
Int'l Search Report issued for PCT/EP2019/055319, dated Apr. 1, 2019.

* cited by examiner a b a b

Classification of surfactants

| Type | Hydrophilic group | |
|---|---|---|
| Anionic surfactants | Sulfate | $-O-SO_3^-$ |
| | Sulfonate | $-SO_3^-$ |
| | Carboxylate | $-COO^-$ |
| Cationic surfactants | Ammonium | $-NR_4^+$ |
| Nonionic surfactants | Polyether | $-O-R$ |
| | Polyalcohol | $-O-H$ |
| Amphoteric or zwitterionic surfactants | Ammonium | $-NR_3^+-$ |
| | Carboxylat | $-COO^-$ |

TREATING POWDER COATING PAINT WASTE MATERIAL FOR RECYCLING, METHODS FOR SAME, AND USE THEREOF

BACKGROUND AND PRIOR ART

Around 1.1 million tons of powder coating are produced worldwide each year, and the trend is rising. Powder coating is a solvent-free material that is increasingly used for coating surfaces, especially for painting metal surfaces.

In contrast to other coating technologies with wet paints, powder paint does not require the use of solvents, so there are no emissions when they are processed. When applying powder coatings, up to 55% overspray is produced, which due to its lack of purity can no longer be returned to production. In addition, further powder coating waste is generated in the production of powder coatings, for example by grinding too finely or other faulty batches or by storage, in particular overlaying stocks or storage under unfavorable storage conditions.

Every year, powder coating waste amounts to around 500,000 tons worldwide. The resulting powder coating residues usually have to be disposed of at great expense. The powder coatings cost about 120-180 €/ton. This is particularly serious, since powder coating is a very high-quality material and costs of approx. 4000 €/ton arise.

A number of recycling processes are known for wet paints, with a particular focus on the treatment of volatile solvents.

WO 2016/044938 A1 discloses the processing of latex paints in order to provide polymeric films. This is achieved by reducing the moisture in the latex paint and removing volatile components, such as the solvent ethylene glycol, using organic acids.

DE 43 01 491 C1 discloses a process for recovering or processing solvent-containing synthetic resin paint waste into solvent-free regenerates. For this purpose, the emulsifier acyl polyethylene glycol ester is added to the synthetic resin paint waste.

EP 0 212 214 A2 discloses a process for recycling paint waste by converting it into an aqueous emulsion. The lacquer waste contains solvents and the conversion of the lacquer waste present in crosslinked form takes place through the addition of surface-active agents and the action of mechanical forces.

DE 4421 669 A1 describes the production of a water-soluble one-component lacquer which can be recovered from oversprays from ultrafiltrates without additives.

WO 97/43056 discloses a process for the reprocessing of solvent-in-water emulsions which have been used to trigger overspray from spray booths. The emulsions contain solvents and color particles dissolved in them. WO 97/43056 describes various process steps in order to separate volatile organic carbonyl compounds from the emulsion.

The aforementioned lacquers and paint residues cannot be compared with powdered powder lacquer waste, particularly due to their liquid form and the presence of solvents. The aforementioned methods can therefore not provide any suggestion for recycling powder coating waste.

Instead, powder coating waste has generally been incinerated with sewage sludge or household waste. Only a few processes are known that deal with the recycling of powder coating waste.

EP 0793 741 B1 discloses a method in which fiber tiles with powder coating waste are processed as binders. Fiber tiles and binder are mixed together and produced as an endless Prepreg, the mixture being heated slightly.

WO 1996/15891 A1 describes the mixing of a thermoplastic powder coating waste in a melt in the extruder, a subsequent breaking of the extrudate into granules and finally the grinding of the granules into a new coating powder. This process is only possible with thermoplastic powder coatings, because unlike thermosetting powder coatings, these can be melted again after they have fully reacted.

WO 2015/006987 A1 describes the mixture of powder coating waste in powder form with cement powder, the mixture then being filled into molds and hardened.

DE 40 28 567 C2 characterizes a method for recycling overspray powder coating in the manufacturing process of powder coatings. The overspray is added to the mixture of raw materials and then goes through the extrusion process together with them. This causes the overspray to melt. The disadvantage of the overspray is that it adheres to metal surfaces of the extruder, which can lead to production delays.

For this reason, DE 197 48 159 A1 suggests compacting the powder coating waste and then grinding it without an extrusion process. During the compacting process, depending on the composition of the powder coating waste, heating and melting may occur on the pressing tools. In addition, in contrast to the processing of powder coating waste in an extrusion process, the high-quality standards cannot be consistently met, particularly with regards to metal coatings. One reason for the hitherto limited possibilities for further processing of powder coating waste is that when heated, powder coating components become irreversibly adherent to metal, which can damage devices and even render them unusable. This fact considerably limits the possibilities for a value-preserving recycling route.

There is therefore a need for alternative recycling methods that overcome the disadvantages of the prior art.

OBJECTIVE OF THE INVENTION

An object of the invention was to provide a recycling process which overcomes the disadvantages of the prior art. In particular, it was an object of the invention to provide a method in which powder coating waste is treated in such a way that further processing is possible without irreversible adhesion to the metal surfaces.

SUMMARY OF THE INVENTION

The object is achieved by a method according to claim 1. The dependent claims represent preferred embodiments for achieving the objective.

The invention preferably relates to a method for recycling powder coating waste in the steps:
 a. Provision of powder coating waste
 b. Providing a reactant
 c. Mixing the powder coating waste with the reactant in order to obtain a reactant-powder coating waste mixture which can be processed further,
the reactant being a surfactant.

A central recycling idea on which the invention is based is the use of powder coating waste as a starting material for further processing, for example by extrusion and injection molding. In such further processing processes, previous processes lead to irreversible adhesion of the powder coating waste mixtures, in particular to metal surfaces of the containers or tools. A first approach to adhesion by coating the metal surfaces with non-stick coatings did not lead to satisfactory results.

Instead, it was recognized according to the invention that chemical inactivation of reactive or functional groups in the powder coating waste can avoid surface adhesion during a further processing process.

Surprisingly, the addition of surfactants as reactants to the powder coating waste led to excellent results. The mixing of the reactant, preferably in powder form, can advantageously be carried out at room temperature and does not require any complex steps. Instead, a mixture of reactant and powder coating waste is reliably obtained, which can be further processed without disadvantageous adhesion to surfaces. The further processing includes, in particular, common further processing of powder coatings for the production and/or use of the powder coatings. In the further processing processes, the reactant powder coating waste mixture can be processed and extruded even at a temperature of 50° C. The mixture is preferably heated to temperatures of at least 60° C. in order, for example, to obtain plastic strands in an extruder, which are then granulated.

In a preferred embodiment of the invention, the method comprises further processing of the reactant powder coating waste mixture at a temperature of at least 60° C. The adhesion-promoting functional groups of the powder coating waste are preferably not inactivated when the powder coating waste is mixed with the reactant, which, as stated above, can also take place at room temperature. Instead, heating the reactant powder coating waste mixture catalyzes reactions which reliably inactivate the functional groups of the powder coating waste, i.e. convert at least so that there is no caking or sticking to the surfaces of the containers or tools during further processing.

The method according to the invention is also characterized by simple handling and the associated high cost-effectiveness. By adding a reactant, the powder coating waste can be reliably converted into a product that can be further processed. For the production of fillers from powder coating waste, it is necessary in a conventional way to allow the old powder coating to harden (in order to reduce the reactivity) and then to carry out a coarse and fine grinding. All of these steps require a high level of personnel or machinery. In contrast to this, the powder coating waste can be mixed directly with a reactant to produce a filler by means of the method according to the invention, without the need for further complex work steps.

Surprisingly, by adding the reactant according to the invention, powder coating waste with a completely different composition can be processed so that it can be reliably processed further. The terms powder coating waste and waste powder coating are used synonymously.

Powder coatings are fine resin particles, either thermoplastic or thermosetting, according to EN ISO 8130-14: 2004, which generally contain pigments, fillers and additives, which remain in one piece when stored under suitable conditions and which, after application by melting and possibly hardening, give a coating. For the purposes of the invention, powder coatings refer to thermoplastic or thermosetting coating powders with a solids content of 100%. Unlike other paints, powder coatings do not contain solvents. The powder coating waste is therefore also preferably solvent-free.

For the purposes of the invention, solvent-free preferably means that no paint solvents are present. Paint solvents are solvents that are used to adjust the properties of a wet paint during the coating process and film formation. In contrast to other paint components, solvents do not become part of the paint layer created. The paint solvents belong in particular to the groups of aliphatic, cycloaliphatic and aromatic hydrocarbons, alcohols, glycols, glycol ethers, ketones and esters. Examples of paint solvents are n-hexane, white spirit, cyclohexane as aliphatic hydrocarbons, xylene or solvent naphtha as aromatic hydrocarbons or propanol, n-butanol and isobutanol as alcohols. For example, butyl glycol, butyl diglycol, ethylene glycol and diethyl glycol are used as glycol ethers. Common esters are butyl acetate, ethyl acetate and 2-butoxyethyl acetate, while butanone and acetone are used as ketones, for example. Typically, the paint solvents are liquid at 25° C. and have a boiling point of 25° C. to 220° C. at 1013 mbar. For powder coatings, reactive thinners can be used instead of solvents, which reduce the viscosity for processing. In contrast to solvents, reactive thinners cross-link with the binders of a lacquer and can become part of the lacquer during the subsequent curing by copolymerization.

Powder coatings or powder coating waste in the sense of the invention accordingly preferably comprises the coloring materials which are solvent-free and preferably have a solids content of 100%. Accordingly, the powder coatings or powder coating waste according to the invention also differ significantly from those of the paint residues described in WO 2016/044938 A1, DE 43 01 491 C1, EP 0 212 214 A2, DE 4421 669 A1 and WO 97/43056. The paint residues shown in this prior art have solvents and are therefore not powder coatings. The average person skilled in the art knows that there are clear chemical and physical differences between these substances. For example, latex paints and latex paint waste are not comparable to powder coating in the sense of the invention. Resin lacquer wastes also have a different composition than powder lacquer wastes and must therefore be treated completely differently, for example in connection with disposal. Another preferred property of the powder coatings in the sense of the invention is that they are not present in an aqueous dispersion. In the sense of the invention, the powder coating waste is also preferably not crosslinked.

Powder coating is highly hydrophobic and therefore cannot be processed in water. An average person skilled in the art therefore has no reason to use a technical teaching, such as that used in EP 0 212 214 A2 or in DE 4421 669 A1, in order to solve the problem according to the invention. The solvent-containing emulsions disclosed in WO 97/43056 also have no chemical relation to powder coatings in the sense of the invention. Liquid and solvent-containing paint residues as described in the prior art must be treated completely differently than the powder coatings in the sense of the invention.

An essential component of powder coatings are binders, which encase solid particles in the coating and determine basic properties such as surface quality, hardness and stability of the coating film obtained. Binders often consist of long-chain, mostly organic compounds that contain reactive or functional groups. In particular, synthetic resins are used for powder coatings, which can crosslink to form branched macromolecules either with one another or via a hardener. Powder coatings, colorants (e.g. pigments, dyes), additives (e.g. leveling agents, degassing agents, waxes, structuring agents) or fillers (e.g. calcium carbonate, talc, barium sulfate) can also be added. The colorants, additives and fillers can be adapted to the respective requirements.

Thermoplastic powder coatings and thermosetting powder coatings are known as basic powder coating types.

Duromeric (hardening) powder coatings are powder coating types in which the film is formed by chemical cross-linking at high temperature after melting and flowing. The thermosetting powder coatings are composed of the following resin and hardener systems:

Duromeric Systems

| | Resin | Hardener | |
|---|---|---|---|
| EP | Epoxy resin | Phenolic hardener Imidazoline derivatives Anhydride adducts | Epoxy resins/ Polyaddition |
| EP-DCD | Epoxy resin | Modified dicyandiamide | Epoxy resins Polyaddition |
| EP-SP | COOH— Polyester resin | Epoxy resins | Hydrid resins Polyaddition |
| SP-HAA | COOH— Polyester resin | Hydroxyalkylamide hardener | Polyester resins Polycondensation |
| SP-GE | COOH— Polyester resin | Aromatic glycidyl esters | Polyester resins Polyaddition |
| SP-PUR | OH— Polyester resin | Blocked Isocyanate adducts | Polyester resins Polyaddition |

Epoxy resins (EP systems) based on bisphenol-A are among the most important powder coating systems, with accelerated or modified dicyandiamide (DCD) being one of the most important hardeners. The solubility of the DCD in the epoxy resin influences the film quality and can be improved by modification. For example, chemical resistance and corrosion protection can be increased by phenols or the persistence against solvents, acids and yellowing can be improved by carboxylic acid hydrides. In contrast, imidazole derivatives are only used as hardeners for matt coatings. These powder coatings are used in particular for the coating of pipelines and pipelines as well as in the electronics industry indoors.

Solid epoxy resins with a melting range according to Kofler between 60° C. and approx. 90° C. are mainly used for the production of powder coatings. In order to be able to obtain three-dimensionally crosslinked polymers from epoxy resins, the resins should be reacted with co-monomers (hardeners) or initiators. The addition reactions taking place have the great advantage that they take place without the formation of volatile by-products. Furthermore, when the tensioned oxirane ring, which contains a short C—O bond, is opened, a longer, noncyclic C—O bond is formed. The consequence of this is that the hardening process is associated with an extremely low volume loss, which is particularly important for technical processing. The ring tension of the epoxy group results in a high reactivity of epoxy resins with many chemical compound classes, which is why a large number of different curing reagents can be used for the crosslinking reaction. The choice of hardener depends, among other things, on the processing method, the reaction conditions and the desired product properties.

The following reaction equation illustrates the hardening of epoxides with phenolic hardener:

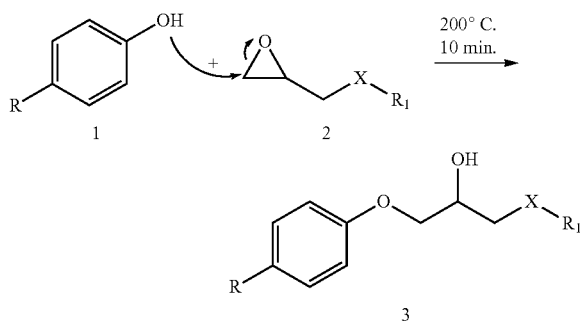

Here, the phenol 1 has two free electron pairs on the oxygen of the hydroxyl group and a high electronegativity, which makes it particularly nucleophilic. As a result, it is able to carry out a nucleophilic attack on the positive ring C atom of epoxide 2. In the epoxy 2 shown above, the left ring C atom is preferred for this attack because it is sterically less hindered than the right one. The attack leads to a ring opening, which is already favored due to the high ring tension of a 3-ring. The resulting tautomeric rearrangement protonates the alcoholate to alcohol 3.

The following reaction equation illustrates the curing of epoxides with imidazoline derivatives:

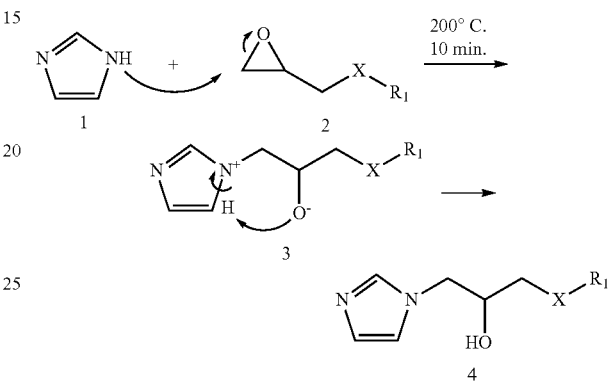

Imidazole 1 uses the lone pair of electrons on nitrogen to carry out a nucleophilic attack on the sterically less hindered ring carbon of epoxide 2, whereupon a ring opening takes place, which is favored by the high ring tension. The alcoholate 3 is protonated to the alcohol 4 by tautomeric rearrangement. Curing epoxy resins using anhydrides is also known.

Polyester systems are composed in particular of resins based on acidic polyesters and hardeners of hydroxyalkyl amides. Due to the water released during the hardening reaction, the layer thickness is mostly limited to 120 μm, since otherwise the formation of 'pinholes' (defects, imperfections) threatens. For most powder coatings, layer thicknesses below 100 μm are aimed for, so that the limitation is practically negligible. Powder coatings based on polyester have excellent resistance outdoors and high resistance to yellowing from ultraviolet light. Their chemical resistance is slightly lower than that of epoxy resins.

Polyester is preferably understood to mean polymeric compounds in which the monomeric units are linked to one another via the ester group and are synthesized by polycondensation of bi-functional carboxylic acids or their derivatives with diols.

Due to their specific, chemical and application properties, saturated polyesters are preferred for powder coating systems. These preferably consist exclusively of hydroxyl and/or carboxyl functional groups and are therefore also preferably combined with polar complementary resins. For example, low molecular weight melamine resins or isocyanate resins highly crosslinked with methanol have proven successful.

Hybrid systems refer to powder coatings, which are based on a mixture of epoxy resins and polyesters. For the production of epoxy resin/polyester mixed powder coatings (hybrid systems), polyester resins are preferably used which contain terminal, free carboxyl groups in the molecule which bring about spatial crosslinking through the addition to epoxy groups. The COOH-functional polyester resins preferably have a molecular weight of a few 1000 g/mol and are referred to as parent resin or hardener because of their larger molecular weight compared to the epoxy resins. The mixing ratio of epoxy resin (EP) to polyester (PES) preferably varies between 60:40 up to 10:90. Powder coatings that are based on such a hybrid system have improved color and UV resistance. Due to their less strong weather resistance, hybrid systems are mainly used for indoor applications.

The following formula shows the reaction mechanism for crosslinking acidic polyester resins and epoxy resins at 200° C./10 minutes.

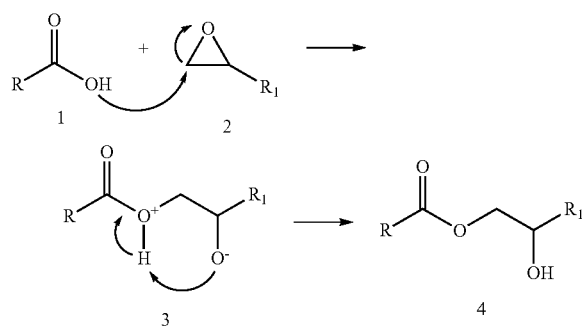

The carboxylic acid 1 can cause a nucleophilic ring opening on the epoxy 2 with a free electron pair of the carboxyl-OH group, so that the alcoholate 3 is formed. The hydroxyester 4 is then formed by tautomerism.

Polyurethane powder coatings are preferably powder coatings which comprise polyurethane as a binder. Examples are on polystyrene polyurethane (SP-PUR) or acrylate resin polyurethane (AC-PUR systems), which are characterized by their special weather resistance. Preferred polyurethane powder coatings are based on OH-functional polyesters or acrylate resins which can be crosslinked with isocyanate adducts, such as the blocked derivative isophorone diisocyanate.

Acrylate powder coatings are preferably based on acrylate resins, preferably on epoxy-functional acrylate resins. For example, acrylic resin-dodecane dicarboxylic acid (AC-DAA powder coatings) epoxy-functional acrylic resins are crosslinked with dodecane dicarboxylic acid.

Advantageously, the addition of the reactant according to the invention permits further processing of powder coating waste which arises during the production or use of the aforementioned powder coating materials.

The powder coating waste prepared in the process according to the invention preferably originates from a powder coating based on an epoxy, polyester, hybrid, polyurethane or acrylate system.

In a preferred embodiment of the invention, the method is characterized in that the powder coating waste comprises a synthetic resin, particularly preferably an epoxy resin, a polyester resin and/or an acrylic resin or mixtures thereof. These powder coating wastes are characterized in that they have a high level of adhesion to metal surfaces without special treatment and thus lead to production faults and device wear during further processing without the addition of the reactants according to the invention.

In a preferred embodiment of the invention, the method is characterized in that the functional groups are selected from a group comprising hydroxyl, epoxy, carboxyl, amino and/or ester groups.

For the purposes of the invention, the functional groups preferably denote chemical groups in the powder coating waste which impart adhesion with metal. The functional groups can therefore also be referred to as reactive groups. According to the invention, it was recognized that the recycling process can be significantly optimized by chemically inactivating functional or reactive groups in powder coating waste.

In a preferred embodiment of the invention, the powder coating waste has functional groups which can mediate adhesion to a metal surface, the reactant causing the functional groups to be inactivated.

Molecules from the group of surfactants are particularly suitable as reactants. Surfactants belong to the molecular class of amphiphilic substances. Molecularly, surfactants are characterized by a hydrophobic (non-polar) hydrocarbon residue and a hydrophilic (polar) part of the molecule. The surfactants are systematically classified on the basis of the hydrophilic part of the molecule or the hydrophilic group (see also FIG. 36).

Anionic surfactants preferably have —COO— (carboxylates), —SO3- (sulfonates) or —O—SO$_3$— (sulfates) as hydrophilic groups. Cationic surfactants preferably have —NR$_4$+(ammonium) as a hydrophilic group. Nonionic surfactants are preferably characterized by —O—R (polyether) or —O—H (polyalcohols) as hydrophilic groups. Amphoteric or zwitterionic surfactants preferably comprise the hydrophilic groups —NR$_2$+- (ammonium) or carboxylate (—COO—).

According to the invention, it was recognized that the hydrophilic groups of the surfactants inactivate the functional groups of the powder coating, so that undesired adhesion, in particular to the metal surface, can be avoided.

Anionic surfactants are particularly preferred. For the purposes of the invention, anionic surfactants in particular also include carboxylic acids.

Carboxylic acids in this sense are aliphatic, cyclic or aromatic mono- or polycarboxylic acids. Preferred molecules have one or more saturated or unsaturated, branched or unbranched carbon chains with or without further functional groups or monocyclic, polycyclic or aromatic carbon regions (hydrophobic region) and one or more carboxyl groups (hydrophilic region). The carboxylic acids can therefore also be referred to as hydrophobic carboxylic acids.

In a preferred embodiment, the reactant is a saturated carboxylic acid. The saturated carboxylic acid residue as a hydrophobic component makes the saturated carboxylic acid particularly stable and effective. In addition, a saturated hydrocarbon chain leads to preferred thermal properties, such as a higher melting temperature. This can ensure that the desired success is achieved even with a preferred heating of the powder coating/reactant mixture.

In a preferred embodiment, the carboxylic acid is a fatty acid. A fatty acid is monocarboxylic acid, i.e. a carboxylic acid with only one carboxyl group. The fatty acid can be a branched, unbranched, cyclic, saturated or unsaturated fatty acid. Examples include but are not limited to:

| | |
|---|---|
| Undecylenic acid | $C_{10}H_{19}COOH$, |
| Oleic acid | $C_{17}H_{33}COOH$, |
| Nervonic acid | $C_{23}H_{45}COOH$, |
| Linoleic acid | $C_{17}H_{31}COOH$, |
| Calendulic acid | $C_{17}H_{29}COOH$, |
| Arachidonic acid | $C_{19}H_{31}COOH$, |
| Cervonic acid | $C_{21}H_{31}COOH$, |
| Tariric acid | $C_{18}H_{32}O_2$, |
| Vernolic acid | $C_{18}H_{32}O_3$, |
| Ricin oleic acid | $C_{18}H_{34}O_3$, |
| Sterculic acid | $C_{19}H_{34}O_2$, |

-continued

| | |
|---|---|
| Lactobacillic acid | $C_{19}H_{36}O_2$, |
| Malvalic acid | $C_{18}H_{32}O_2$ |
| Chaulmoogras acid | $C_{18}H_{32}O_2$, or |
| Mycolic acid | 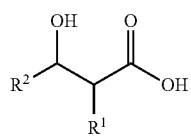 | with R1: linear alkanes, $C_{20}$-$C_{24}$; R2: Complex structures of up to 60 carbon atoms.

In a particularly preferred embodiment, the reactant is a saturated fatty acid, very particularly preferably a saturated fatty acid with the empirical formula $C_nH_{2n+1}COOH$, preferably n=5-30. Examples include but are not limited to:

| | |
|---|---|
| Octanoic acid | $C_7H_{15}COOH$, |
| Decanoic acid | $C_9H_{19}COOH$, |
| Dodecanoic acid | $C_{11}H_{23}COOH$, |
| Hexadecanoic acid | $C_{15}H_{31}COOH$, |
| Octadecanoic acid | $C_{17}H_{35}COOH$, |
| Nonadecanoic acid | $C_{18}H_{37}COOH$, |
| Phytic acid | $C_{19}H_{39}COOH$, |
| Hexacos anoic acid | $C_{25}H_{51}COOH$, or |
| Tetra triacontanoic acid | $C_{33}H_{67}COOH$. |

In a particularly preferred embodiment of the invention, the reactant is a stearic acid (octadecanoic acid).

In a further preferred embodiment of the invention, the reactant is a palmitic acid (hexadecanoic acid).

Carboxylic acids, in particular the preferred ones, are surprisingly reliable for inactivating functional groups in powder coating waste. Carboxylic acids are characterized by a hydrophobic radical (R) and one or more carboxyl groups COOH. FIG. 1 shows chemical reactions under which functional groups can be inactivated in the powder coatings. These include acidic hydrolysis of a nitrile, esterification of a carboxyl group, nucleophilic or electrophilic ring opening of an epoxy group, anhydride formation, amide formation or ester hydrolysis.

The following reactions can be used to inactivate the respective functional groups using carboxylic acids.

The chemical formulas are shown below using a saturated carboxylic acid, which has an unbranched aliphatic carbon chain. The radical (R) can also have branched, saturated or unsaturated hydrophobic regions.

Esterification:

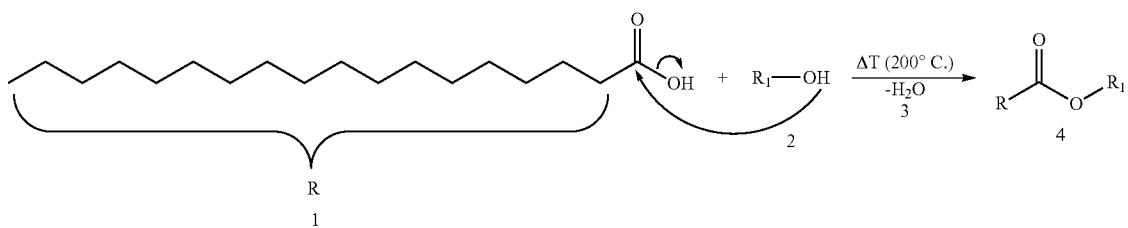

The alcohol 2 attacks nucleophilically with a free pair of electrons of the hydroxyl oxygen on the carbonyl carbon of the carboxyl group of the carboxylic acid 1. The hydroxyl group is formally split off, which combines with the hydroxyl proton of alcohol 2 to form water 3, which immediately escapes as water vapor (gaseous) at the reaction temperature of 200° C. An ester 4 is formed.

Both the nucleophilic and the electrophilic ring opening of the epoxy groups provide the same product. The two reactions differ mechanically as follows.

Nucleophilic Ring Opening:

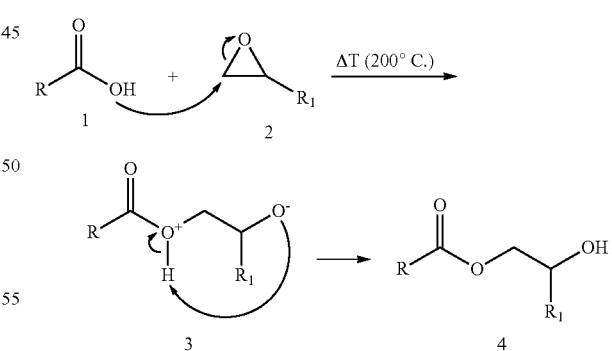

The carboxylic acid 1 attacks with a free electron pair of the hydroxyl group of the carboxyl on the sterically less hindered carbon atom of the epoxide 2, whereupon the bond to the ring oxygen folds over and the ring opens. Intermediate stage 3 is formed. The alcoholate oxygen binds the excess proton from the ester group, so that the ester oxygen becomes uncharged and the alcohol group forms next to the rest R1 and thus a hydroxy ester (4).

Electrophilic Ring Opening:

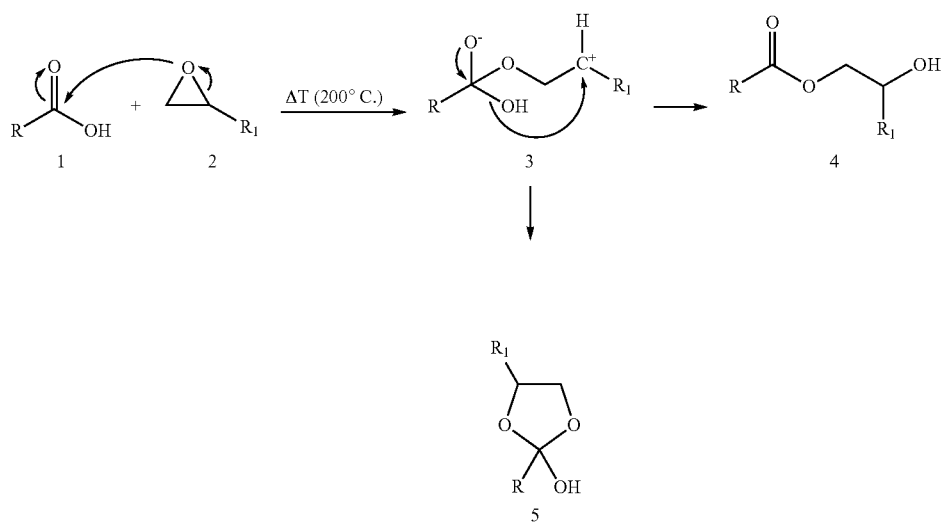

Since the carbonyl carbon in the carboxylic acid 1 is positively polarized by the higher electronegativity of the oxygen and thus represents an electrophilic position, this can be attacked nucleophilically by the ring oxygen of the epoxide 2. As a result, the carbonyl oxygen is negatively charged and intermediate 3 is formed. In theory, this can continue to react in two different ways. On the one hand, one of the free electron pairs of the negatively charged oxygen can fold over into a double bond and thus reform the carbonyl. As a result, the hydroxyl group of the original acid group is split off as a hydroxide. This can immediately attach to the positively charged carbon atom of the intermediate and thus form the hydroxyester 4 from the secondary carbenium ion. On the other hand, an intramolecular ring formation would also be theoretically conceivable, in which the negatively charged oxygen attacks the positively charged carbon atom and thus forms the unstable hydroxy acetal 5. Since a polymeric structure that is sterically hindered is considered here, this variant should rather be regarded as a theoretical by-product. In addition, in analogy to the Erlenmeyer rule, it can be assumed that either the alcohol group directly on the acetal carbon would not be stable and would therefore split off quickly, or that the acetal would split up and give a geminal diol, which, according to the Erlenmeyer rule, tends to occur immediately to go into an equilibrium in which both the hydrated form of this ester and the dehydrated form are present.

Anhydride Formation:

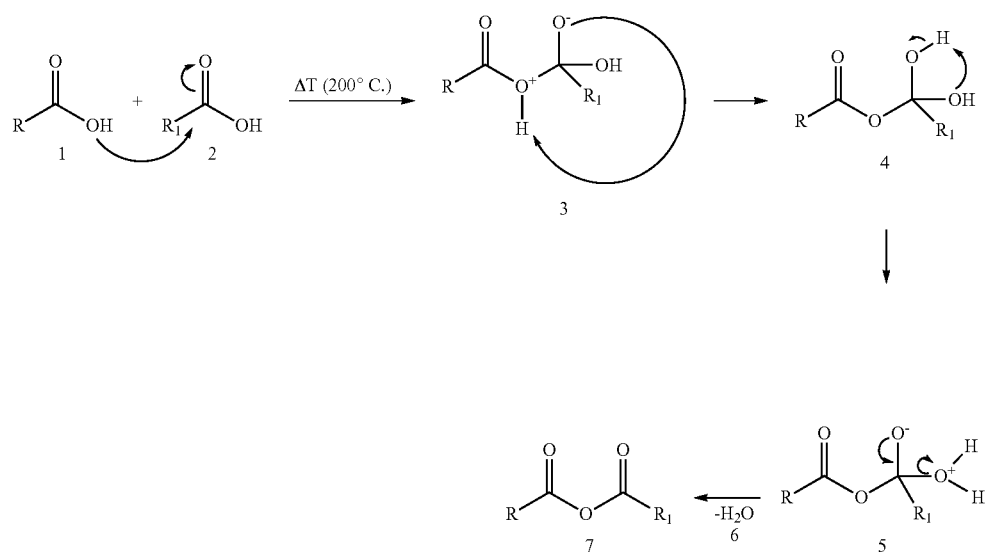

The hydroxyl oxygen in the carboxyl group of carboxylic acid 1 nucleophilically attacks the carbonyl carbon of carboxylic acid 2. This creates intermediate 3. To balance the charge separation, a proton is rearranged tautomerically to the negatively charged oxygen, so that a hydroxyl group is formed. Since a geminal diol (4) is formed, the Erlenmeyer rule works, according to which water (6) can be split off as a neutral molecule after tautomeric rearrangement of a proton (5) from one hydroxyl group to another. A free electron pair of the negatively charged oxygen folds over, so that a carbonyl group and thus the carboxylic anhydride 7 is formed.

The nucleophilic nitrogen of the amino group of the primary amine 2 nucleophilically attacks the carbonyl carbon of the carboxylic acid 1. Intermediate 3 is formed. A proton rearranges tautomerically from positively charged nitrogen to negatively charged oxygen, so that a geminal diol (4) is formed. According to the Erlenmeyer rule, a proton is rearranged from one to the other hydroxyl group (5) and water 6 is split off. The amide 7 is formed. Analogously to this, the reaction mechanism for the reaction of the secondary amine shown in the anhydride formation takes place.

Acidic Ester Hydrolysis:

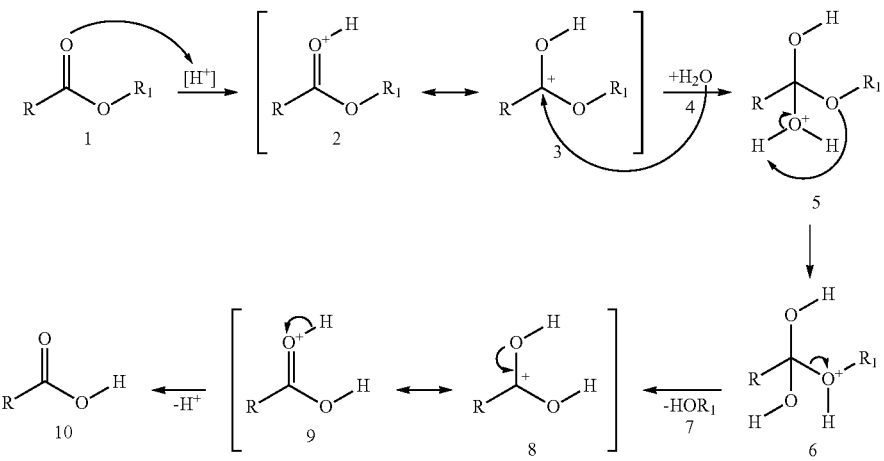

Amide Formation:

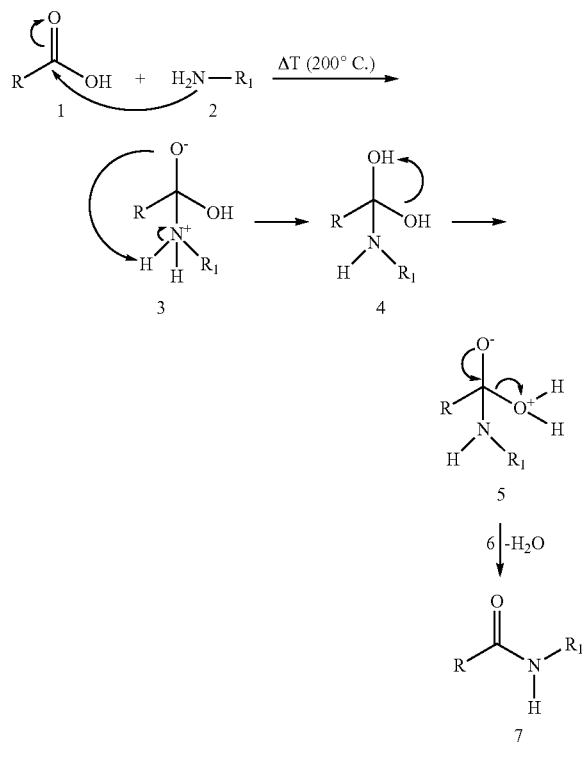

With a lone pair of electrons of carbonyl oxygen, polyester 1 attacks a proton (from the dilute acid) that occurs in catalytic amounts. This creates the mesomeric intermediate 2 or 3. The nucleophilic water (4) can now attack the carbenium ion 3 formed. Since water is rather weakly nucleophilic, this attack is only possible through the carbenium ion formed by the addition of the proton. The addition product 5 is formed, which tautomerically rearranges a proton of the water attached to the ether oxygen and thus forms the intermediate stage 6. As a result, the neutral alcohol molecule 7 can be split off, so that the mesomeric intermediate 8 or 9 is formed. In order to obtain the carboxylic acid 10, the proton is split off from the former carbonyl oxygen. In a further preferred embodiment of the invention, the reactant is a saturated, monounsaturated or a polyunsaturated fatty alcohol.

For the purposes of the invention, fatty alcohols are preferably simple or polyvalent aliphatic, cyclic or aromatic hydrophobic alcohols. Fatty alcohols preferably comprise a hydrophobic radical R and a hydroxyl group. Preferred fatty alcohols can be represented in the formula R—OH, where R is any straight-chain or branched, saturated or unsaturated alkyl group having 6 to 30 carbon atoms. Saturated fatty alcohols are particularly preferred. Examples of suitable fatty alcohols are: 1-hexanol, 1-heptanol, 1-octanol, 1-decanol, 1-dodecanol (lauryl alcohol), 1-tetradecanol (myristyl alcohol), 1-hexadecanol (cetyl alcohol), 1 heptadecanol (margaryl alcohol), 1-Octadecanol (stearyl alcohol), 1-eicosanol (arachidoyl alcohol), 1-docosanol (behenyl alcohol), 1-tetracosanol (lignoceric alcohol), 1-hexacosanol (ceryl alcohol), 1-octacosanol (montanyl alcohol), 1-triacontanol (melissyl alcohol)-Hexadecen-1-ol (palmitoleic alcohol), cis-9-octadecen-1-ol (oleyl alcohol), trans-9-octadecen-1-ol (elaidyl alcohol), cis-11-octadecen-1-ol, cis, cis-9,12-octadecadien-1-ol (linoleoyl alcohol), 6,9,12-octadecatrien-1-ol (γ-linolenoyl alcohol).

Advantageously, fatty alcohols also allow inactivation of functional groups in the powder coating waste. This applies in particular to powder coating waste which has hydroxyl, epoxy, carboxyl, amino and/or ester groups as functional groups.

The mechanisms of action of the fatty alcohols are analogous to those described above for the hydrophobic carboxylic acids. This applies in particular to the acid hydrolysis of nitriles and the nucleophilic and electrophilic ring opening.

In a further preferred embodiment of the invention, the reactant is a polyethylene glycol (PEG). The terms polyethylene glycol and PEG are used synonymously. For the purposes of the invention, the surfactants therefore preferably also comprise PEGs as reactants, which, owing to polar hydroxide groups, can be assigned to the nonionic surfactants.

In the sense of the invention, PEG preferably means a linear or branched polymer, comprising structures of the empirical formula —($CH_2$—$CH_2$—O—) n- with n=2-4000, preferably n=5-400. PEGs thus preferably comprise a chain of Monomers (—$CH_2$—$CH_2$—O—). The term PEG particularly preferably also denotes polymers which have a majority, i.e. more than 50%, of —CH2CH2O— monomeric basic units. Chemically, the PEGs are polyethers of glycol (dihydric alcohol) ethanediol. PEGs with the empirical formula R1-(—$CH_2$—$CH_2$—O—) n-R2 can have different radicals, R1=H and R2=OH being particularly preferred.

Excellent results have been achieved for the surfactants as reactants, in particular the preferred saturated carboxylic acids and polyethylene glycols mentioned. Using the reactants, the powder coating waste could be processed at various temperatures without any liability or other process-preventing processes. In addition to the aforementioned reactions, the low adhesion of the reactant powder coating mixture to surfaces can also be attributed to van der Waals forces, which lead to a reduction in adhesion between the surfactants through a suspected micelle formation.

It is further preferred that the reactant is in powder form at room temperature in order to allow easy mixing with the powder coating waste.

Surfactants which have a melting temperature of above 30° C., preferably above 50° C., particularly preferably above 60° C., are particularly preferably used, since they can be admixed as powder to the powder coating waste. Reactants with a melting temperature below 30° C. can also be used. In this case, these are introduced into the powder coating waste via spray or trickle systems.

The increased melting temperature of the preferred surfactants of over 50° C., preferably over 60° C., also has a particularly positive effect on the processability of the reactant powder coating waste mixture. For example, it is preferred that the further processing of the reactant powder coating waste mixture takes place at a temperature of at least 60° C., sometimes at a significantly higher temperature. By selecting reactants with a melting temperature of over 60° C. it can be ensured that there is sufficient stability during the various process steps and that the functional groups of the powder coating waste are permanently inactivated.

Other advantages of saturated carboxylic acids, especially stearic acid, are their compatibility with powder mixtures. They are dust-free, have good flow properties, are also resistant and have a high abrasion resistance. They are also suitable for silo storage, so that they can be used on an industrial scale.

Advantageously, even a small amount of the reactants is sufficient to inactivate the functional groups of the powder coating waste and thus to obtain a further processable product.

In a preferred embodiment of the invention, the process is characterized in that the reactant powder coating waste mixture
i) 90-99.5% by weight of the powder coating waste and
ii) 0.5-10% by weight of the reactant
comprises, wherein the wt.-% refer to the total weight of the reactant powder coating waste mixture and are less than or equal to 100 wt.-%.

The embodiment is distinguished by a particularly high level of economy, since only small amounts of the reactant have to be used. Nevertheless, these mixtures provide excellent results with regard to the processing of various powder coating waste.

In a further preferred embodiment, the method is characterized in that during further processing of the reactant powder coating waste mixture, the mixture comes into contact at least partially with a metal surface. When powder coatings are processed in extruders or injection molding machines, the powder coatings usually come into contact with metal surfaces. Without processing the powder coating waste using the method according to the invention, severe caking or adhesion can occur, in particular on metal surfaces. The prevention of such adhesion by chemical inactivation of the functional groups of the powder coating waste represents an essential advantage of the invention, which is particularly useful in the preferred embodiment. In a further preferred embodiment, the method is characterized in that the reactant powder coating waste mixture from c) is further processed in an extruder and/or an injection molding machine In a further preferred embodiment, the method is characterized in that the reactant-powder coating waste mixture is further processed in an extruder in order to obtain plastic strands which are subsequently processed into granules. It may be preferred to heat the mixture to at least 60° C., 70° C., 80° C. or 90° C. The addition of the reactant can also rule out the possibility of adhesion at these temperatures. Instead, granules can be obtained from plastic strands in a reliable manner, which can be used directly in injection molding machines, for example.

In a further embodiment, the invention also relates to powder coating products which have been produced by recycling powder coating waste using a method according to the invention or preferred embodiments thereof. It is particularly preferred to use the further processed powder coating waste as a filler in a wide variety of industrial applications.

DETAILED DESCRIPTION

The invention is to be explained in more detail below with the aid of examples, without being restricted to these.

It is pointed out that various alternatives to the described embodiments of the invention can be used to implement the invention and to arrive at the solution according to the invention. The embodiments of the process according to the invention or the powder coating products which can be produced therefrom are therefore not limited to the preferred embodiments mentioned. Rather, a large number of design variants are conceivable, which may differ from the solution shown. The aim of the claims is to define the scope of the invention. The scope of protection of the claims is aimed at covering the methods according to the invention and powder coating products which can be produced therefrom as well as equivalent embodiments thereof.

Figure 1:
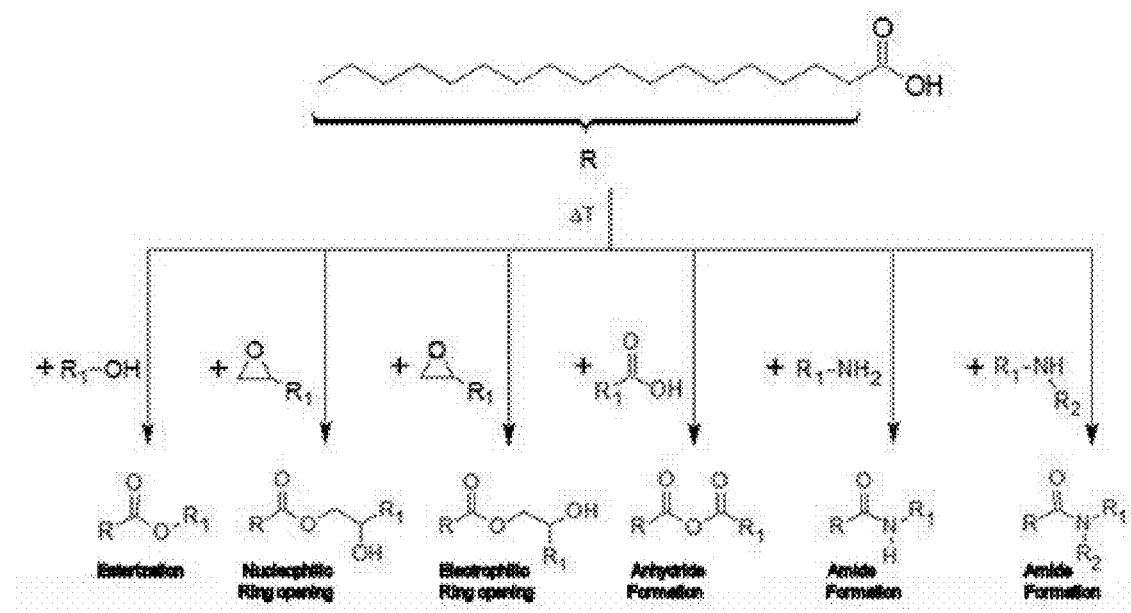
FIG. 1: Reactions between stearic acid and various polar groups in the powder coatings

The test panels were made of steel and the test field was 15 cm×10 cm. The metal plate was previously cleaned with isopropanol. The mixture was then applied to the metal plate with a spatula in a thin layer and distributed. The mixtures were cured for 10 min at 200° C. in an oven (Heraeus D-6450). After the powder coating samples had cooled, it was tested whether and how easy/difficult these mixtures could be removed from the metal plate using a spatula.

TABLE 1

| Chemical inactivation reactants Unhardened unmixed powder coatings mixed with reactants | | | | |
|---|---|---|---|---|
| Reactant | Concentration [Mol] | Epoxide Rating | Polyester | Hybrid |
| Nitric acid | 0.5 | 4 | 2 | 1 |
|  | 1 | 4 | 2 | 4 |
|  | 2 | 3 | 1 | 4 |
|  | 4 | 3 | 2 | 3 |
| Sulfuric acid | 0.5 | 1 | 4 | 4 |
|  | 1 | 3 | 3 | 4 |
|  | 2 | 3 | 2 | 2 |
|  | 4 | 3 | 3 | 3 |
| Hydrochloric acid | 0.5 | 4 | 3 | 4 |
|  | 1 | 4 | 2 | 4 |
|  | 2 | 2 | 4 | 4 |
|  | 4 | 3 | 4 | 3 |
| Urea | 4 | 3 | 4 | 4 |
|  | 6 | 3 | 4 | 4 |
|  | 8 | 2 | 4 | 4 |
| Sodium hydroxide | 0.5 | 4 | 1 | 2 |
|  | 1 | 4 | 1 | 3 |
|  | 2 | 3 | 1 | 1 |
|  | 4 | 2 | 1 | 2 |

TABLE 1-continued

Chemical inactivation reactants
Unhardened unmixed powder coatings mixed with reactants

| Reactant | Concentration [Mol] | Epoxide | Polyester Rating | Hybrid |
|---|---|---|---|---|
| Potassium hydroxide | 0.5 | 4 | 2 | 2 |
| | 1 | 4 | 4 | 4 |
| | 2 | 1 | 1 | 3 |
| | 4 | 1 | 1 | 3 |
| Triethylamine | 0.5 | 4 | 4 | 4 |
| | 1 | 4 | 3 | 4 |
| | 2 | 4 | 4 | 4 |
| | 4 | 1 | 4 | 4 |
| Triethylamine and Sodium hydroxide | 2 | 4 | 1 | 2 |
| | 4 | 1 | 2 | 4 |
| Triethylamine and | 4 | 1 | 2 | 2 |
| Triethylamine and potassium hydroxide and Zinc acetate dihydrate | 4 | 1 | 1 | 3 |
| Sodium borohydride 2% | 2% | 4 | 2 | 2 |
| Ammonium chloride | 4 | 3 | 4 | 4 |
| | 8 | 3 | 4 | 4 |
| Ammonium chloride and potassium chloride | 8 | 1 | 1 | 1 |
| Guanidinium carbonate | 0.5 | 1 | 1 | 1 |
| | 1 | 1 | 1 | 1 |
| | 2 | 4 | 4 | 4 |
| Stearic acid 2% | 2% | 1 | 1 | 1 |
| Stearic acid 3% | 3% | 1 | 1 | 1 |

Table 1 shows a summary of the results and a ranking of the reactants with regard to their suitability for removing the powder coating from the metal surface:
1: very well deactivated, easy to remove from the metallic surface
2: well inactivated, more force needed to remove from the metallic surface
3: moderate, partly inactivated, difficult to remove from the metallic surface
4: poor, not inactivated and very difficult to remove from the metallic surface It can be seen from the results in Table 1 that ammonium chloride and potassium chloride, guanidinium carbonate, stearic acid 2% and stearic acid 3% are particularly suitable for detachment. With these reactants, each 2 g of old powder paint residues (batch 1-3) were individually mixed with 10 ml and cured. The results of this series of tests are summarized in Table 2. This test was repeated twice to confirm the reproducibility.

TABLE 2

Chemical activation of uncured old powder paint mixtures with reactants
Unhardened old powder paint mixtures mixed with reactants

| Reactant | Concentration [Mol] | Batch 1 | Batch 2 Rating | Batch 3 |
|---|---|---|---|---|
| Ammonium chloride and potassium chloride | 8 | 1 | 1 | 1 |
| Guanidinium carbonate | 0.5 | 1 | 1 | 1 |
| | 1 | 1 | 1 | 1 |
| Stearic acid 2% | 2% | 1 | 1 | 1 |
| Stearic acid 3% | 3% | 1 | 1 | 1 |

The following conclusions can be drawn from the results in Tables 1 and 2:

The epoxy powder coatings (EP) showed good results in the tests with sulfuric acid, potassium hydroxide solution and the mixtures based on ammonium, in particular at high concentrations in an alkaline medium. Nucleophilic ring openings leading to delamination are conceivable as reasons.

In the case of polyester powder coatings (PP), good delamination can be seen in some cases with an acid and the bases as well as with the ammonium salt/potassium hydroxide mixture. The cause is the added acid, which leads to acidic ester hydrolysis. Saponification (basic hydrolysis) is probable for bases.

The hybrid powder coatings (HP) showed a positive result with the weak acid and the strong alkali. With these hybrid powder coatings, an ester cleavage and then a ring opening of the epoxide could take place first. This would lead to a deactivation.

The old powder paint residues (batch 1-3) contained several components that can be found in the pure powder coatings. In comparison of the old powder paint residues with the pure powder coatings, it became apparent that there were no differences in the reactions with the corresponding reactants.

In summary, the test series with ammonium chloride/potassium hydroxide and the tests with guanidinium carbonate gave good results for pure powder coatings and old powder coating mixtures.

The best result of the series of tests for metal adhesion could be achieved with the hydrophobic carboxylic acid, stearic acid.

Figure 2:
FIG. 2: Comparison of the uncured old powder paint residues (bottom) and the hardened powder paint residues (top). Sample Charge 2 (black) with $NH_4Cl/KOH$ is Sample Charge 1 (red) with guanidinium carbonate.

In addition, the metal surfaces showed no impairment when using stearic acid. In contrast, when using ammonium chloride/potassium chloride or guanidinium carbonate, metal plates showed strong rust formation after 1-2 days (see FIG. 2). The lower left FIG. 2 shows the mixture of batch 2 (black) of the initially uncured old powder paint residues, mixed with ammonium chloride/potassium hydroxide. The right side of the metal plate in FIG. 2 shows the mixture of the first unhardened old powder paint residues from batch 1 (red), mixed with guanidinium carbonate, which were then cured for 10 min at 200° C. Visible in the picture above, the mixtures could be easily removed after the plate had cooled. However, the metal plates used showed strong rust formation after 1-2 days.

The reactants guanidinium carbonate and ammonium chloride showed good results in the delamination between the metal surface and powder coatings, but since salts would attack and destroy metal surfaces in extruders or other equipment for further processing, they are unsuitable for economical recycling of powder coatings.

EXAMPLE 2: COMPARISON OF ADDITIONAL AMOUNTS OF SUITABLE REACTANTS

To compare the effects of different amounts of stearic acid added to old powder paint residues (batches 1 and 2) for metal detachment, analytical measurements for proportions of 2% or 3% stearic acid were carried out using DSC curves and FTIR spectra.

Figure 3:
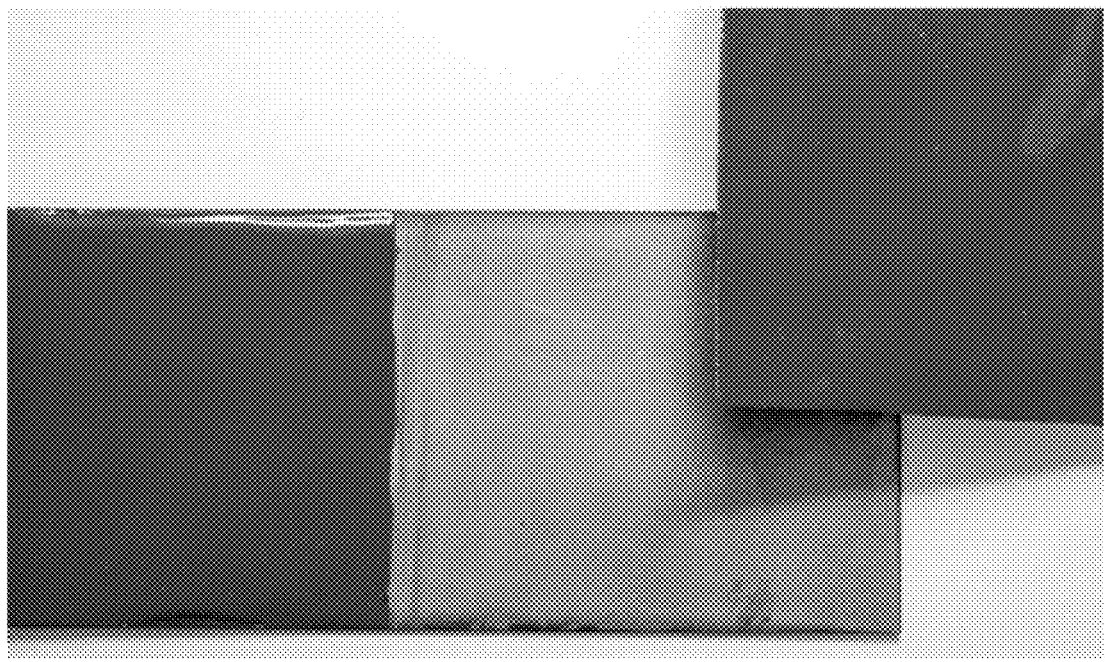
FIG. 3: Attempt to detach old powder paint residues (batch 1) mixed with 2% stearic acid

FIG. 3 shows the mixture of batch 1 (red) of the initially uncured old powder paint residues, mixed with 2% stearic acid. The right side of the metal plate is coated with the old powder paint residue/stearic acid mixture, while the left side was only covered with uncured old powder residues from batch 1. The sample was then cured at 200° C. for 10 minutes. After cooling, the right side could easily be lifted off.

Figure 4:
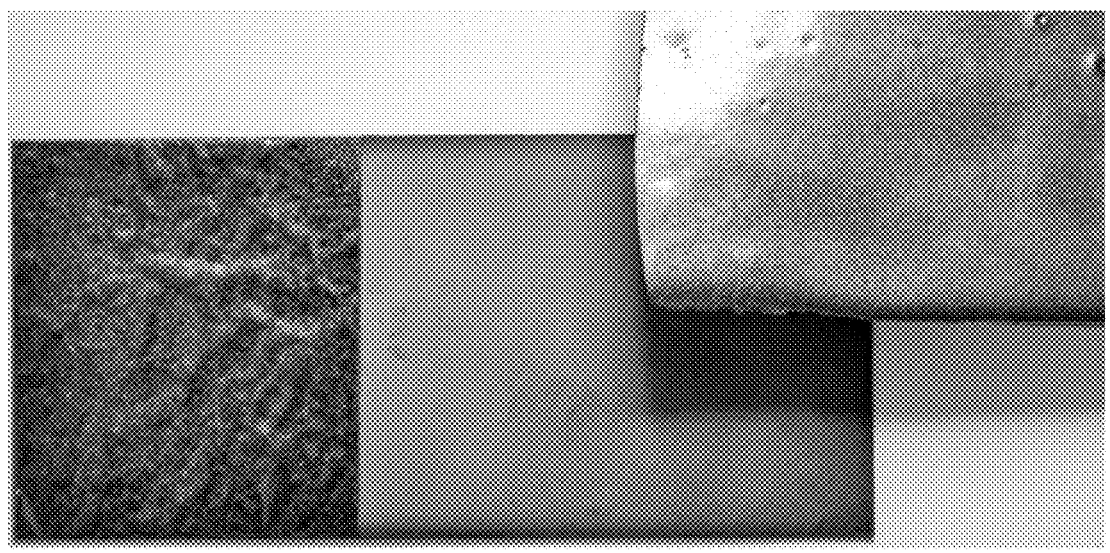
FIG. 4: Deboning test of old powder paint residues (batch 2) mixed with 3% stearic acid

FIG. 4 shows the mixture of batch 2 (black). On the right side, the uncured old powder paint residue was provided with 3% stearic acid, whereas the unhardened old powder paint residue on the left side remained untreated. After curing for 10 min at 200° C., the cooled mixture could be easily removed from the right side of the metal. For reproducibility, the pure powder coatings (EP, PP, HP) and old powder coating residues from batches 1-3 were mixed with 2% and 3% stearic acid and tested twice with the same results.

In addition, a verification was carried out using DSC curves.

Figure 5:
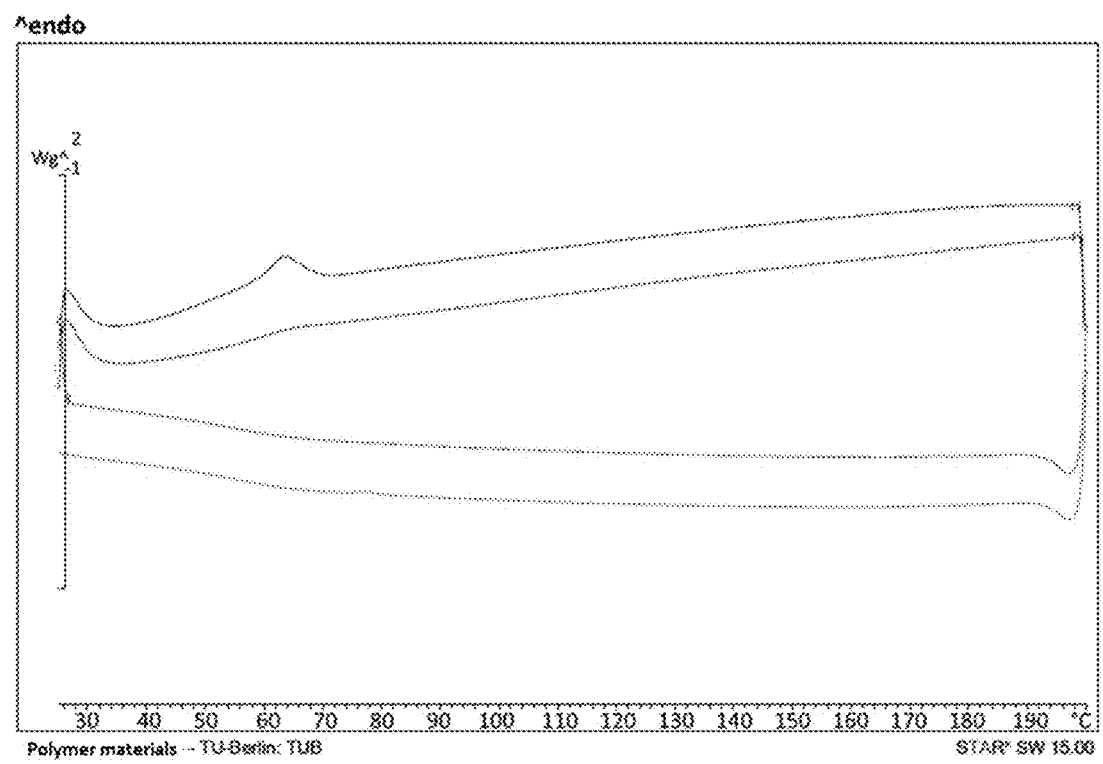
FIG. 5: DSC curve for cured old powder paint residues (batch 1) with 2% stearic acid

The uncured old powder paint residue (batch 1) was mixed with 2% stearic acid (FIG. 5) and was then cured using a differential scanning calorimeter (DSC, Differential Scanning calorimetry). The heating rate for the measurements is fixed at 20 K/min. The measuring range is limited to 25° C.-200° C. FIG. 5 shows a melting and cross-linking peak between 65° C. and 70° C. during the first heating ($1^{st}$ curve from above), the glass transition point at approx. 70° C. can be seen on the second heating line. The cooling curves ($3^{rd}$ and $4^{th}$ curve) are unremarkable.

The differential calorimetric measurement of the uncured powder coating residue (batch 1) with 3% stearic acid (FIG. 6) shows a melting and crosslinking peak between 65° C. and 70° C. during the first heating, with the second heating line the glass transition point is approx. 70° C. observable.

Figure 6:
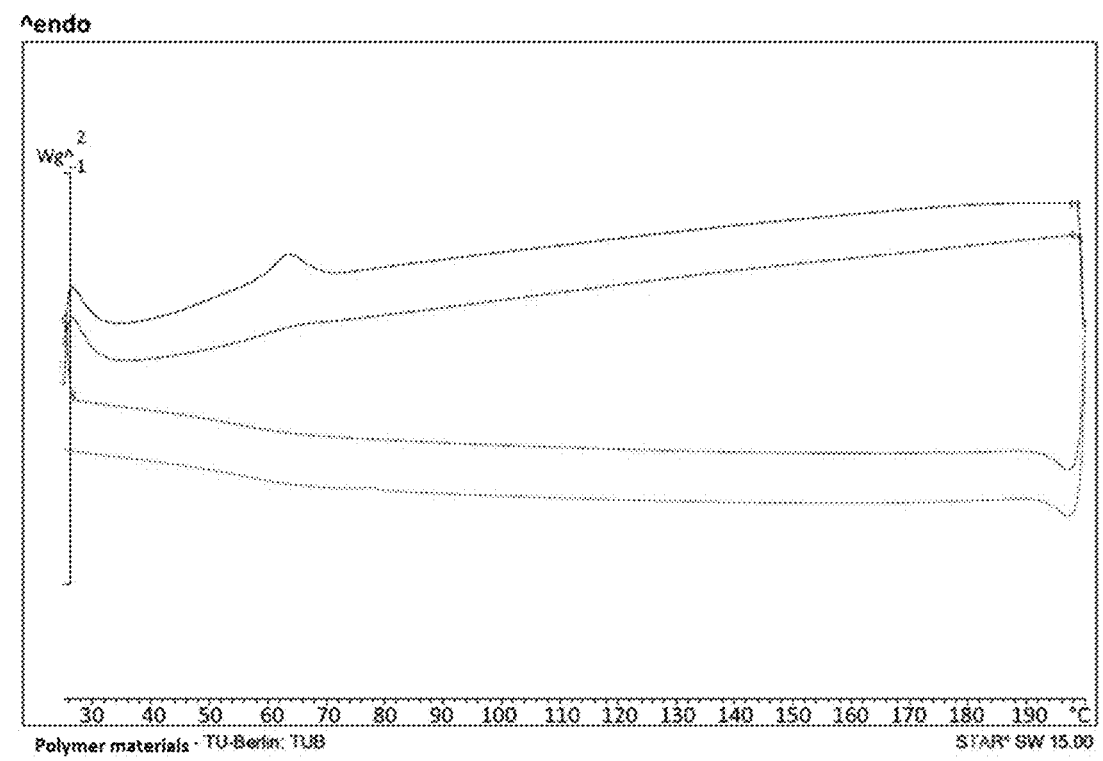
FIG. 6: DSC curve for cured old powder paint residues (batch 1) with 3% stearic acid

FIGS. 5 and 6 show melting peaks that indicate sufficient hardening, whereby the melting peak appears somewhat smaller when mixed with 2% stearic acid than when mixed with 3% stearic acid. This can be explained by the different proportions of stearic acid. The cooling curves are unremarkable.

Figure 7:
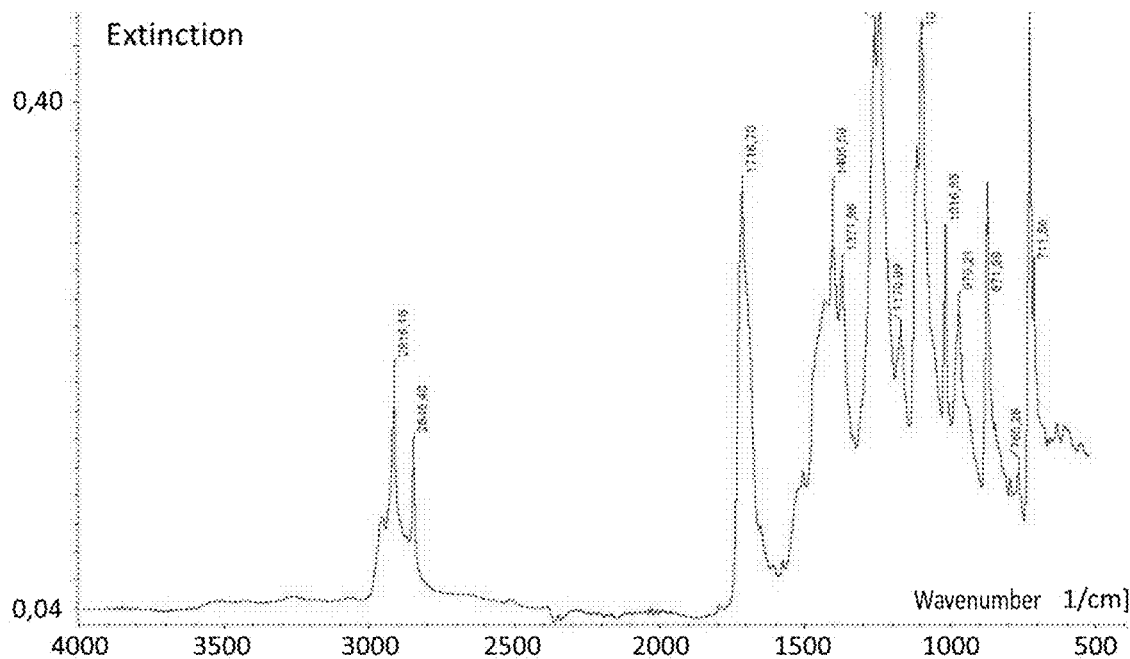
FIG. 7: FTRI spectroscopy of waste powder paint residues (batch 1) mixed with 2% stearic acid
Figure 8:
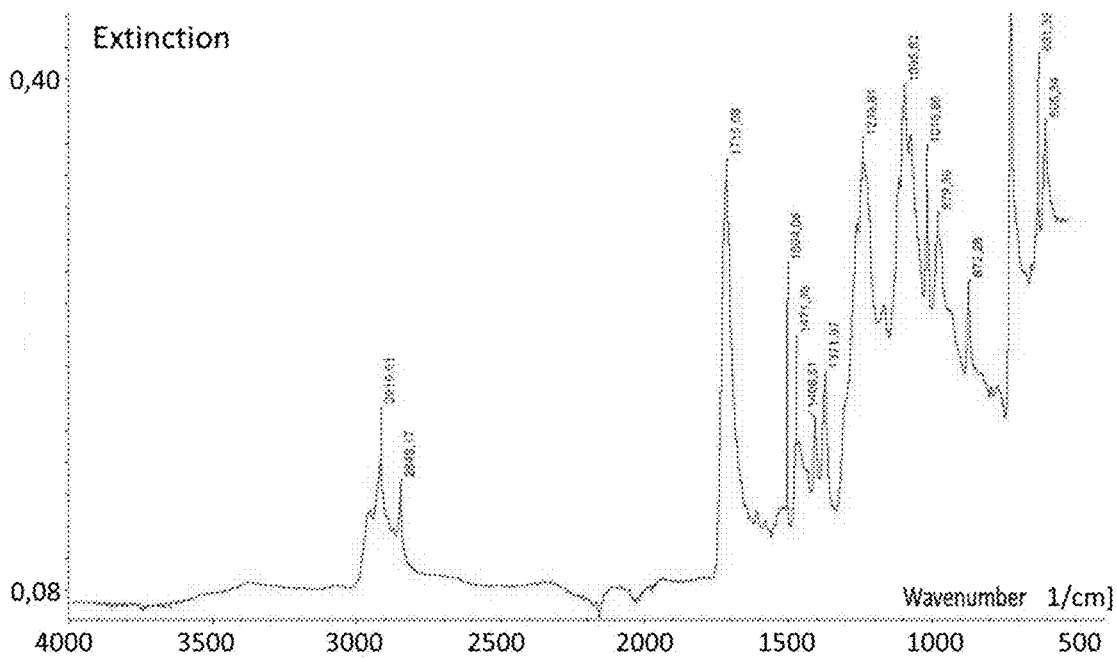
FIG. 8: FTRI spectroscopy of waste powder paint residues (batch 1) mixed with 3% stearic acid

Furthermore, a review of old powder paint residues (batch 1) mixed with 2% stearic acid (FIG. 8) and 3% stearic acid (FIG. 7) was carried out after 10 minutes at 200° C. using FTIR. The vibration bands in FIGS. 7 and 8 are 3000 $cm^{-1}$-2500 $cm^{-1}$ and thus correspond to the wave numbers of amine, methyl and methylene groups. These groups are very broad and indicate stearic acid or residual powder paint groups.

At 3500 $cm^{-1}$-3100 $cm^{-1}$ there are amine and amide groups, which indicate hardener groups of old powder paint residues. The vibrations at 1285 $cm^{-1}$-970 $cm^{-1}$ correspond to those of alcohol, phenols and carboxylic acids and can therefore be identified as a polyester powder coating residue. Characteristic of ether are the wave numbers 1310 $cm^{-1}$-820 $cm^{-1}$ and these belong to the epoxy powder paint residues.

The different size of the peaks between FIGS. 3000 $cm^{-1}$-2150 $cm^{-1}$ is evident from the different proportions of stearic acid. The peak of the mixture with 2% stearic acid (FIG. 8) appears smaller than the rash of the mixture with 3% stearic acid (FIG. 7).

To complete the test series, tests were also carried out with 1% stearic acid under the same conditions. The results showed no serious differences in the DSC curves and the FTIR spectra. The mixtures of the old powder paint residues with 1% stearic acid could be removed easily, but not quite as easily as for 2% or 3% stearic acid. The additions of 2% and 3% stearic acid to the old powder coating residue show comparable analytical measurement results.

EXAMPLE 3—EXPERIMENTAL ANALYSIS OF POSSIBLE REACTION OF HYDROPHOBIC CARBOXYLIC ACID WITH POWDER COATING WASTE

In order to check possible reaction equations between hydrophobic carboxylic acid with powder coating waste, the FTIR spectra of the cured unmixed powder coating materials (EP, PP, HP) were compared with those of the hardened unmixed powder coating materials, which were mixed with a 2% stearic acid additive. As a further comparison, an FTIR measurement of a cured old powder coating residue without stearic acid and a corresponding FTIR measurement with 2% stearic acid were also carried out (batch 1 in each case).

Figure 9:
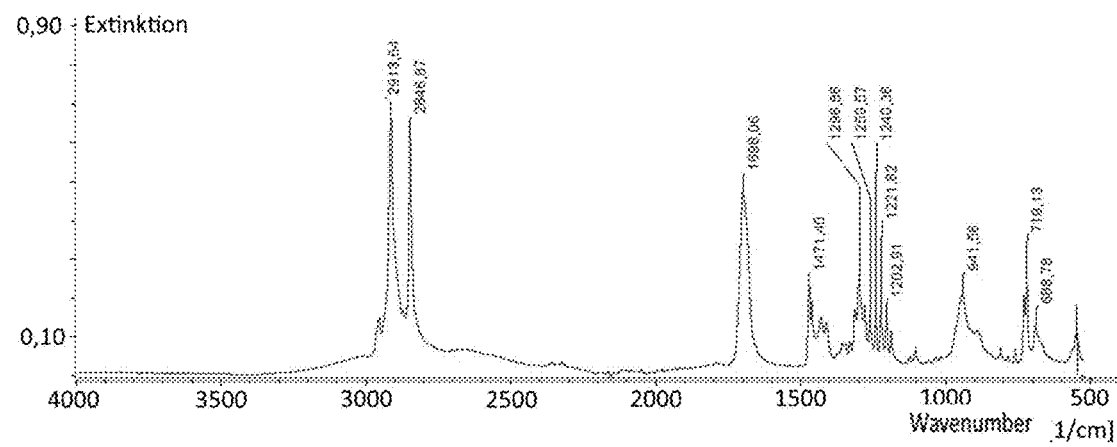
FIG. 9: FTIR spectrum of pure stearic acid

The bands at 3000 $cm^{-1}$-2500 $cm^{-1}$ are characteristic of pure stearic acid (FIG. 9). They are assigned to the bridged OH groups of carboxylic acids.

The wave numbers 3020 $cm^{-1}$ to 2800 $cm^{-1}$ indicate methylene and methyl groups, which are represented in stearic acid due to their structural formula. A classic peak emerges at 1698 $cm^{-1}$ and belongs to the compound class of carboxylic acids.

In the case of pure epoxy powder coating (FIG. 10), vibration bands at 3500 $cm^{-1}$ and 3300 $cm^{-1}$ can be attributed to the wave numbers of the amino groups. The bands at 3000 $cm^{-1}$-2500 $cm^{-1}$ have been assigned to bridged OH groups of carboxylic acids Amines and amides are also visible at the wave number 1400 $cm^{-1}$ and 850 $cm^{-1}$, as well as ether groups at 1230 $cm^{-1}$ and 1011 $cm^{-1}$. This could be attributed to reactions of the epoxides with modified dicyandiamide. This creates alcohol groups, which were determined at 3650 $cm^{-1}$-3200 $cm^{-1}$ and 700 $cm^{-1}$, which lead to a strongly cross-linked guanidine derivative.

Figure 10:
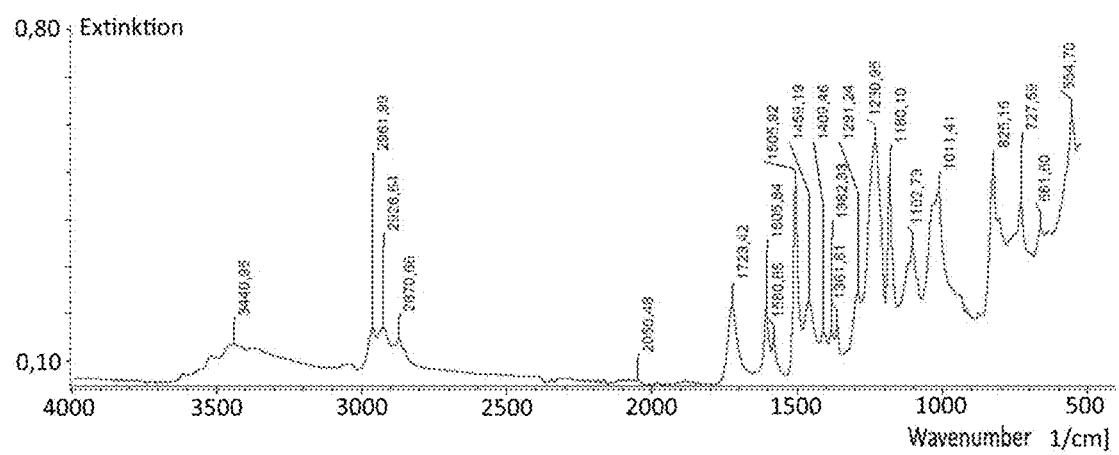
FIG. 10: FTIR spectrum of a single-grade epoxy powder coating cured for 10 min at 200° C.

Striking in the spectrum of the pure epoxy powder coating with 2% stearic acid in (FIG. 11) are the bands of the wavelengths 3020 $cm^{-1}$-2800 $cm^{-1}$ of the methyl and methylene groups and the bands at 3300 $cm^{-1}$-2500 $cm^{-1}$ of the bridged OH groups of carboxylic acids that are higher, more intense and wider than in (FIG. 10). They are characteristic of stearic acid.

By adding stearic acid, the band peaks at 1732 $cm^{-1}$ are higher than in FIG. 10 and new peaks at 1010 $cm^{-1}$ and 945 $cm^{-1}$ are also due to carboxylic acid groups. At the wave numbers 3620 $cm^{-1}$-3200 $cm^{-1}$ and 700 $cm^{-1}$, band peaks can be observed, which belong to the class of compounds of alcohols and which could indicate reactions of epoxides with modified dicyandiamide. The resulting reaction products of alcohols and the acid group of stearic acid now available can lead to ester formation, a newly formed ester peak is detectable at 1037 $cm^{-1}$.

At 1294 $cm^{-1}$ and 820 $cm^{-1}$ bands of ether groups are visible, which are larger in the FTIR spectrum of the cured epoxy powder coating with 2% stearic acid than in the pure cured epoxy powder coating without stearic acid. One cause could be that primarily stearic acid reacted with hydroxyl groups of the hydroxyamide hardeners to form esters and the ether groups of the epoxide were not consumed.

Figure 11:
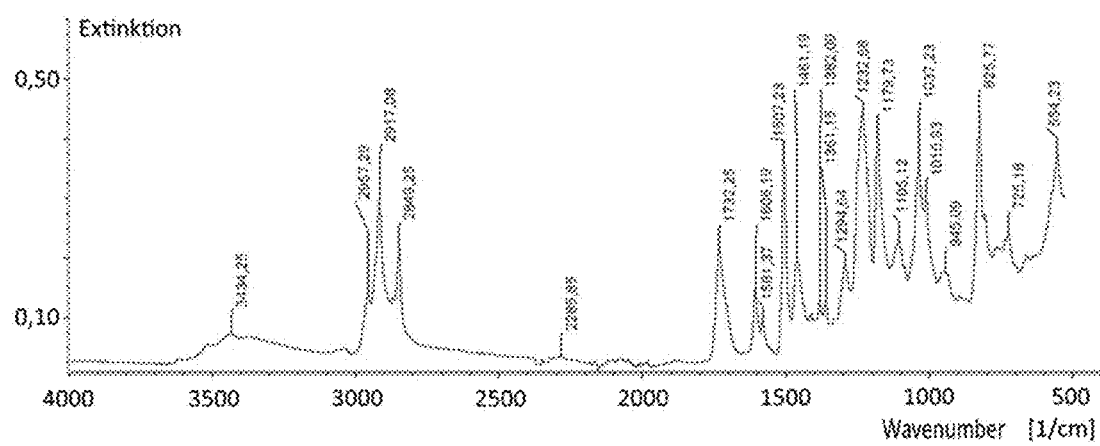
FIG. 11: FTIR spectrum of a single-grade epoxy powder coating cured with 2% stearic acid for 10 min at 200° C.

In the comparison of FIG. 9 of the pure stearic acid and FIG. 11 of the hardened epoxy powder coating with 2% stearic acid, a clear agreement can be seen.

Figure 12:
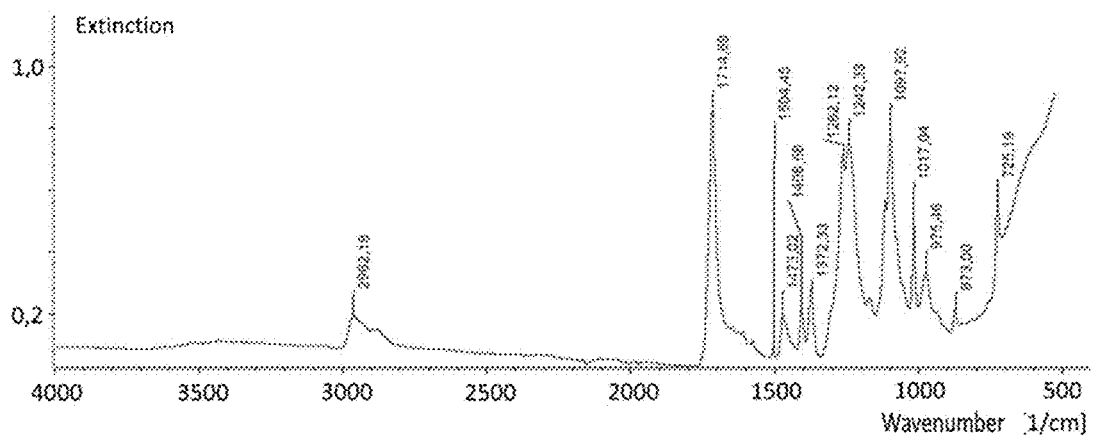
FIG. 12: FTIR spectrum of a single-grade polyester powder coating cured for 10 min at 200° C.

The FTIR spectrum in FIG. 12 shows a single-grade cured polyester powder coating.

The wavenumbers gave chemical compound classes of amides in the following bands: 3500 $cm^{-1}$-3100 $cm^{-1}$ and 1372 $cm^{-1}$. The carboxylic acid peak is unmistakably 1714 $cm^{-1}$.

The bands determined indicate that polyester resins are crosslinked with hydroxyalkyl amide hardeners. The reaction product would be an ester amide. The wave numbers of the ester groups are 1097 $cm^{-1}$ and that of an amide is 1020 $cm^{-1}$. This indicates an ester amide.

Figure 13:
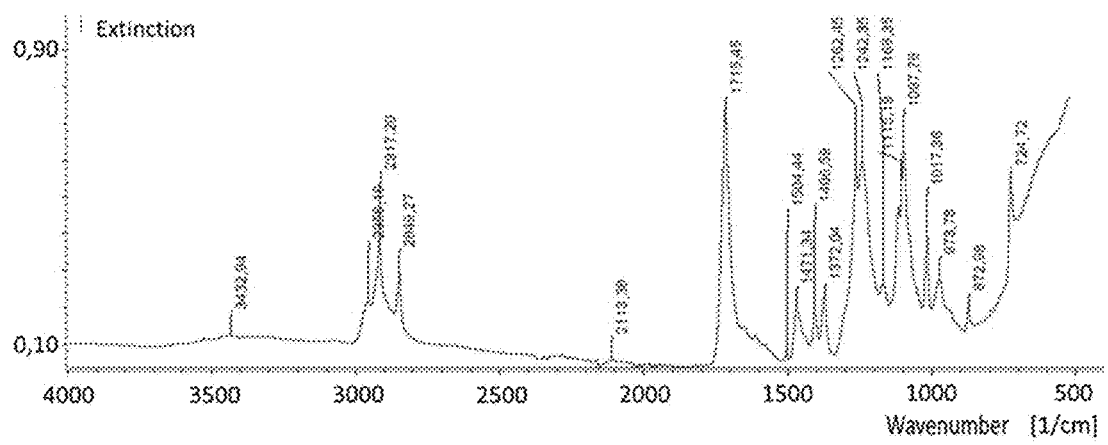
FIG. 13: FTIR spectrum of a pure polyester powder coating cured with 2% stearic acid for 10 min at 200° C.

FIG. 13 clearly shows the single-grade hardened polyester powder coating with 2% stearic acid the higher and more pronounced bands of the wavenumbers 3020 $cm^{-1}$-2800 $cm^{-1}$ of the methyl and methylene groups. The bands at 3300 cm$^{-1}$-2500 cm$^{-1}$ of the bridged OH groups of carboxylic acids are also more intense and wider in comparison to FIG. 12. With the addition of stearic acid, an increase in the reaction products would have been expected, which was not confirmed in FIG. 13. However, broader intensities in the region of the wave numbers 3432 cm$^{-1}$ can be observed, which indicate water formation or storage. Since the bridged OH groups of carboxylic acids at 3000 cm$^{-1}$-2500 cm$^{-1}$ are also assigned to this area, this finding suggests the remaining stearic acid groups, which were not involved in the formation of the ester amide and thus led to an increase in intensity. The spectra of FIGS. 12 and 13 are equivalent except for the wave number ranges 3000 cm$^{-1}$-2500 cm$^{-1}$, the prominent area of stearic acid.

In hybrid systems, polyester resins are used which contain carboxyl groups and cause spatial crosslinking through the addition to epoxy groups. Carboxylic acids containing carboxyl groups were found at the wave numbers 975 cm-1, the most significant peak was at 1716 cm$^{-1}$ (see FIG. 14). Epoxy groups could be assigned to the wave numbers 1241 cm$^{-1}$ and 872 cm$^{-1}$. The resulting hydroxy ester could be detected at 1040 cm$^{-1}$ wave numbers. FIG. 15 of the pure cured hybrid powder coating with 2% stearic acid also shows higher and more pronounced bands of the wavelengths at 3020 cm$^{-1}$-2800 cm$^{-1}$, the methyl and methylene groups, and the bands at 3300 cm$^{-1}$-2500 cm$^{-1}$, of the bridged OH groups of carboxylic acids, in comparison to FIG. 14 with 100% pure hybrid powder coating.

Figure 14:
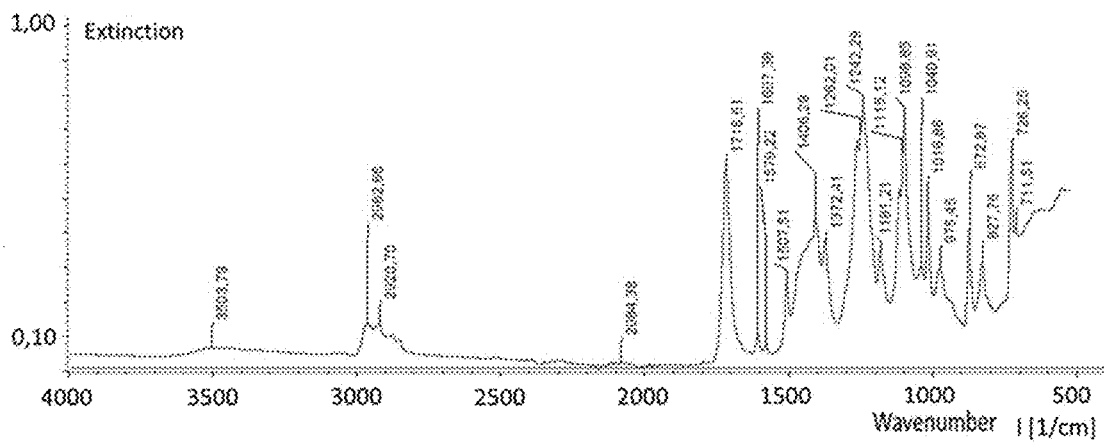
FIG. 14: FTIR spectrum of a pure hybrid powder coating cured for 10 min at 200° C.
Figure 15:
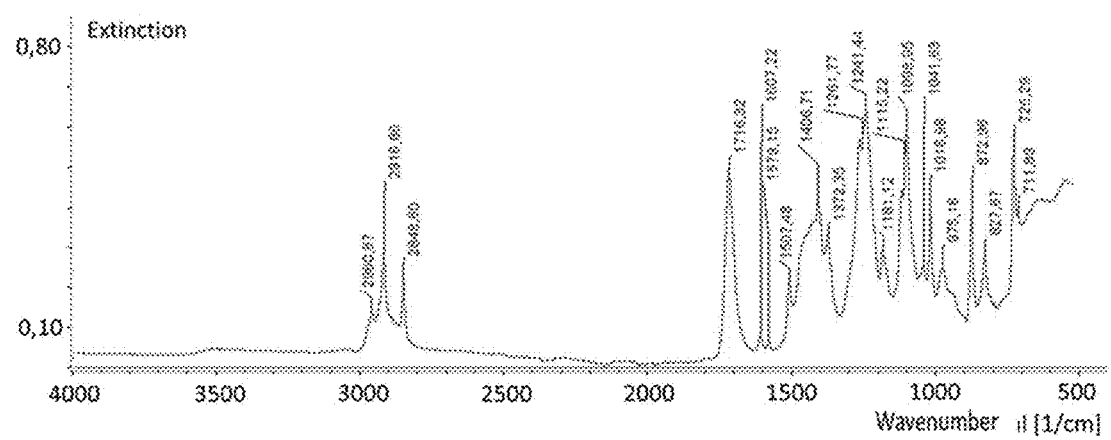
FIG. 15: FTIR spectrum of a pure hybrid powder coating cured with 2% stearic acid for 10 min at 200° C.

The spectra of FIG. 14 and FIG. 15 are except for the wavenumber ranges 3500 cm$^{-1}$-2500 cm$^{-1}$, the prominent area of stearic acid, also equivalent.

Conclusions from FIG. 15 on the whereabouts of the remaining stearic acid groups that were not involved in the ester formation reaction can be attributed to the growth in the intensity of the peak at the wavenumber 2960 cm$^{-1}$ of bridged OH groups of the carboxylic acids and the higher and wider peak 1716 cm$^{-1}$, a connecting group of the alkyl carboxylic acids.

Figure 16:
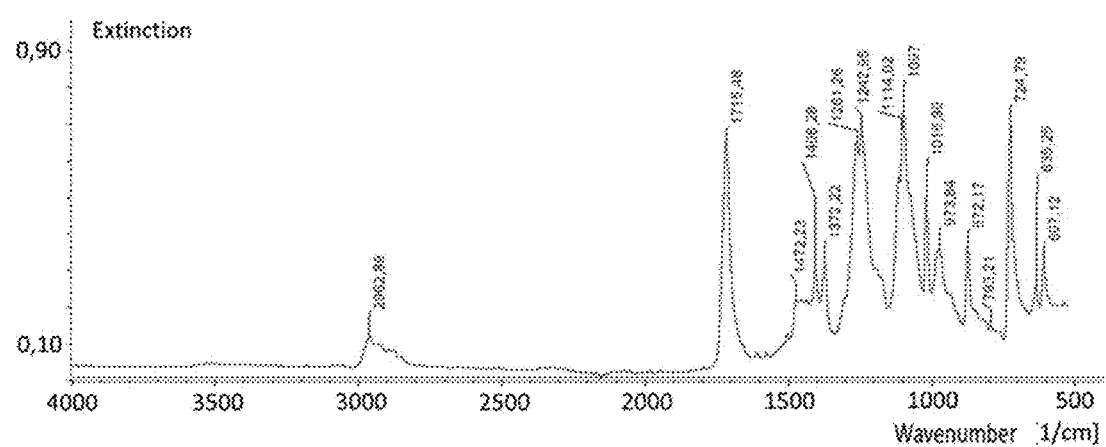
FIG. 16: FTIR spectrum of old powder paint residues (batch 1, red) cured for 10 min at 200° C.

As shown in FIG. 16, the sample consisting of 100% hardened old powder paint mixture, the following classes of compounds could be identified and assigned. At 1261 cm$^{-1}$ and 1242 cm$^{-1}$ ether groups could be recognized, at 872 cm$^{-1}$ epoxies. The corresponding hardener groups of the amides are visible at the wave numbers 3500 cm$^{-1}$-3100 cm$^{-1}$. They can be attributed to reactions of the epoxides with modified dicyandiamide.

The wave numbers 1715 cm$^{-1}$ and 973 cm$^{-1}$ indicate carboxylic acids. The presence of the amides and the detection of the ester groups at 1097 cm$^{-1}$ make it likely that polyester resins will crosslink with hydroxyalkyl amide hardeners to form an ester amide.

Figure 17:
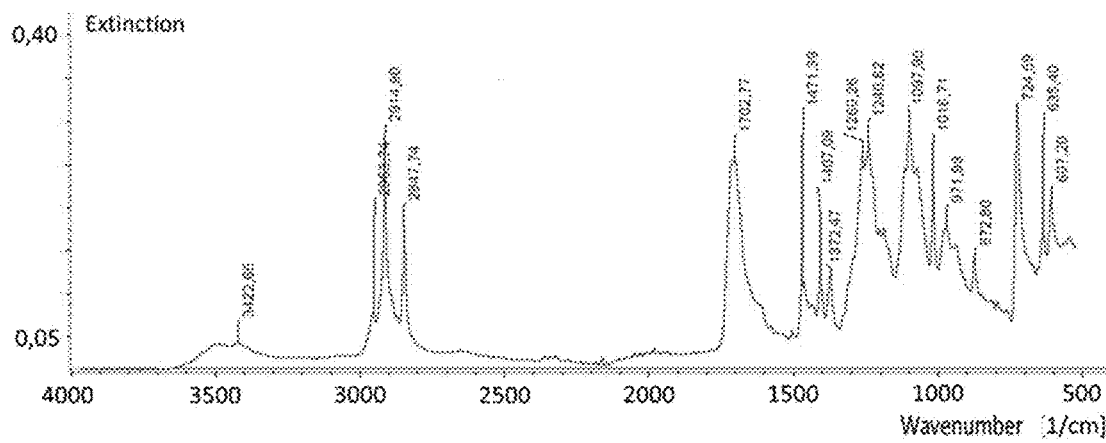
FIG. 17: FTIR spectrum of old powder paint residues (batch 1, red) cured with 2% stearic acid for 10 min at 200° C.

The sharply increased, enlarged bands of the wavelengths 3020 cm$^{-1}$-2800 cm$^{-1}$ with the addition of 2% stearic acid to the hardened old powder coating mixture in FIG. 17 and a new peak at 1471 cm$^{-1}$ are assigned to the methyl and methylene groups. The bands at 3300 cm$^{-1}$-2500 cm$^{-1}$ of the bridged OH groups of carboxylic acids are also higher, larger and wider than in FIG. 16 and indicate the remaining stearic acid. By adding stearic acid, the band peaks at 1702 cm$^{-1}$ are wider than in FIG. 16 and new peaks at 1200 cm$^{-1}$ and 950 cm$^{-1}$ also confirm the formation of carboxylic acid groups.

In summary, it can be stated that stearic acid, as a saturated carboxylic acid, participates in the crosslinking reactions of the powder coatings due to its carboxyl group, the remaining unreacted groups being clearly visible in the FTIR spectrum. The FTIR spectra were able to detect the stearic acid in the hardened powder coating systems (EP, PP, HP) and old powder coating residues (batch 1-3).

EXAMPLE 4—RHEOMETER MEASUREMENTS

To check the suitability of the reactants for the production of recyclable waste powder coating, the following materials were compared using the Physica MCR rheometer:
  a. 2 g uncured old powder paint residues (batch 2)
  b. 2 g of uncured old powder paint residues (batch 2) including 2% stearic acid
The test was carried out within a defined temperature range of 60° C. to 200° C. The heating rate was 11.2° C./min. The most important parameters are listed in Table 3

| Number of measuring points N | Time/ measurement point t/N | Measurement profile amplitude g | Angular Frequency w | Temperature T |
|---|---|---|---|---|
| 120 | 5 s | 0.001 | 10 rad/s | 60 . . . 200° C. linear |

Figure 18:
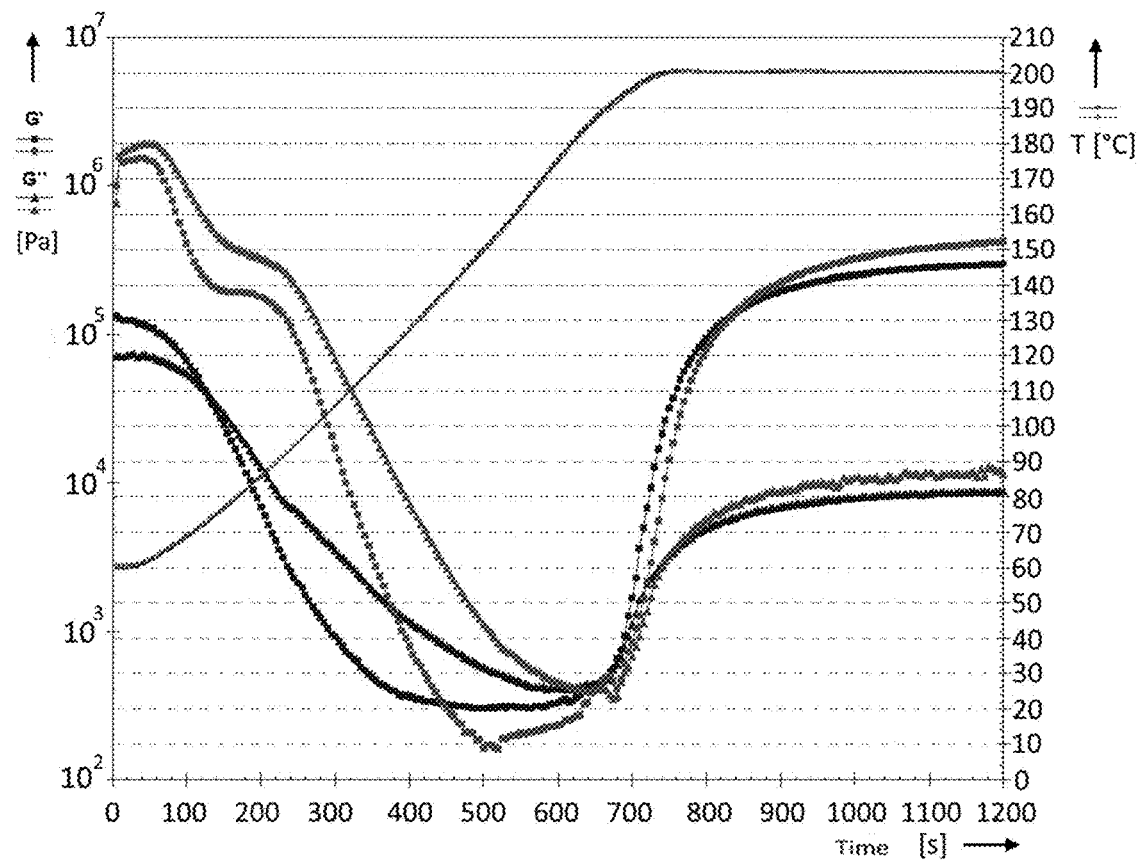
FIG. 18: Curves of the rheometer measurements of the uncured old powder paint residue (batch 2) (red curve) and the uncured old powder paint residue (batch 2) including 2% stearic acid (blue curve)

Table 3: Characteristic values of the rheometer measurement of the uncured old powder paint residue (batch 2) and the uncured old powder paint residue (lot 2) including stearic acid FIG. 18 shows the curves of the uncured old powder paint residue (batch 2) and the uncured old powder paint residue (batch 2) including 2% stearic acid. The storage module G' characterizes the elastic part, the loss module G" the viscous part of the sample. In FIG. 18, G' is higher than G" at the starting point for both samples. The elastic part is therefore larger than the viscous part. The viscosity of the uncured old powder paint residue (batch 2) is higher, and the flow behavior is lower than that of the sample with stearic acid. The stearic acid melts earlier between the powder particles, the viscosity is lower and the sample begins to flow faster.

The softening point of the uncured old powder paint residue (batch 2) was (minimum) at 640 s, where the value of G" was 3.96×102 Pa. The softening point of the uncured old powder paint residue including stearic acid was 615 s and G" was 4.03×102 Pa as a minimum. When considering the softening points, both values are relatively close together. The course of the largest possible melting, represented and confirmed by the minimum of the curves in FIG. 18, is comparable for the samples. What is striking is the agreement of the gel points, which are marked by the intersection of the storage and loss modulus with the uncured old powder coating residue (batch 2) with a measured value of 655 s and with the uncured old powder coating residue (batch 2) including 2% stearic acid with 660 s. Accordingly, the following values were identical for the measured values of G" with 4.1×102 Pa and G' 4.13×102 Pa for the uncured old powder paint residue (lot 2) and the measured values of the uncured old powder paint residue (batch 2) inclusive 2% stearic acid with G" 4.6×102 Pa and G' at 4.65×102 Pa. The crosslinking or film formation starts at the same time and temperature for both samples. No difference could be found by adding stearic acid.

The curing points provided different measurement results: the uncured old powder paint residues (batch 2) had a value of G 'at 4.2×105 Pa, the uncured old powder paint residues (batch 2) including 2% stearic acid had a lower value of G' in comparison 3.0×105 Pa. The elastic portion of the uncured old powder paint residues (lot 2) including 2% stearic acid is smaller than that of the uncured old powder paint residues (lot 2). The complete crosslinking reaction in the sample with stearic acid takes longer than in the uncured old powder coating residue (batch 2) without stearic acid.

The results show that the mixture of the uncured old powder paint residues (batch 2) including 2% stearic acid shows a characteristic behavior of a commercially available powder paint, which could be melted and crosslinked without any problems.

Figure 19:
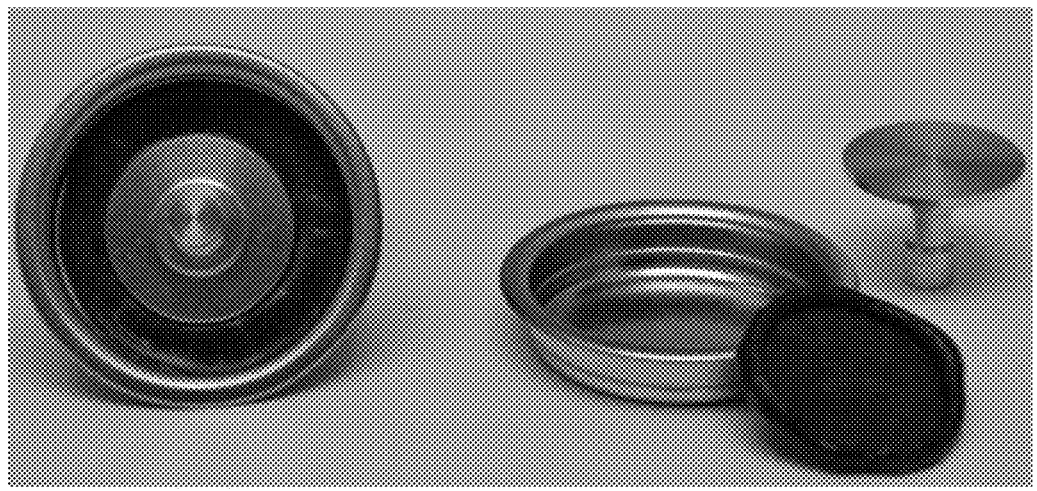
FIG. 19: Adhesion and delamination of the powder coating in the crucibles with and without the addition of stearic acid

The removal of metal adhesion in FIG. 19 is a particular advantage. The cured old powder paint residues (batch 2) with the addition of stearic acid could easily be removed from the metal shell used for the measurement. It was not possible to remove the cured material from the sample with the uncured residues of old powder paint (batch 2). The old powder paint residues were firmly attached to the metal surface.

EXAMPLE 5—RECYCLED POWDER COATING WASTE AS FILLER FOR POLYETHYLENE

The following experiments show mixing tests in order to be able to process the modified waste powder paint residues first in the extruder and then in the injection molding system.
Materials
The following materials were used:
a) Polyethylene LLDPE (Low Linear Density Polyethylene) Dowlex SC 2108G
b) uncured old powder paint residue (batch 3) including stearic acid
c) cured old powder paint residue (batch 3)
d) stearic acid
Polyethylene The material LLDPE Dowlex SC 2108G from DOW was selected based on the technical parameters. A decisive point was the low melting temperature and the good surface sliding properties of the material during processing.
Uncured Old Powder Paint Residue (Batch 3)

In each case, 5 kg of dry, uncured powder coating residues (batch 3) were weighed out in plastic containers, mixed with 2% stearic acid and mixed with wooden spatulas. This mixture was then used as a filler.

Cured Old Powder Paint Residue (Batch 3)

Cured powder coating served as a filler in the mixture as a comparative sample. The powder coating was first cured on large sheets, which were lined with PTFE, film, in the Heraeus oven (Heraeus Holding GmbH) at 200° C. for 10 minutes. After cooling, the solid powder coating plates were roughly broken with a hammer and pre-ground in a Herbold SML 180/100 shredding system from Zerkleinerungstechnik GmbH (grain size approx. 1 mm-2 mm). Subsequently, the approximately 150 kg of pre-ground powder coating residues were finely ground to a final grain size of less than 150 µm by the Ganzlin coating company.
Stearic Acid Stearic acid was selected as the saturated carboxylic acid as the reactant for the chemical deactivation of the old powder coating residues. The stearic acid was 90% pure and was obtained from abcr GmbH.

EXAMPLE 6—PREPARATION OF SUITABLE EXTRUDATES

An extruder from the company Göttfert was used for material extrusion of the samples. The tests in the Collin extruder, Dr. Collin GmbH, repeated. The Collin extruder has a diameter of 20 cm and a screw length of 25 D. Significant differences could not be determined. The temperatures and speed settings used are shown in Table 4:

TABLE 4

Parameters of the extruders used

| Extruder | Sample/mixtures | Speed [m/s] | Zone 1 [° C.] | Zone 2 [° C.] | Zone 3 [° C.] | Zone 4 [° C.] |
|---|---|---|---|---|---|---|
| Göttfert | Sample A: hardened old powder paint residues (batch 3) Sample B: 50% LLDPE/50% old powder paint residues (batch 3) including 2% stearic acid | 50 | 200 | 200 | / | / |
| Collin | Sample A: 50% LLDPE/50% hardened old powder paint residues (batch 3) Sample B: 50% LLDPE/50% old powder paint residues (batch 3) including 2% stearic acid | 60 | 230 | 230 | 230 | 232 |

Sample A: 50% LLDPE Mixed with 50% Hardened Old Powder Paint Residues (Batch 3)

The components were weighed into a container by hand. Due to the grain size fineness of the hardened powder coating, there was a significant dust load. When mixed with a wooden stick, the first signs of segregation appeared after about 5 minutes of stirring. The segregation resulted from the difference between the two mixture components, such as density, surface quality or—mainly—different particle size. Compounding in this sample proved difficult in the Göttfert extruder. The two components always separated. The dust pollution could only be reduced by adding small portions of the mixture. We waited until the funnel was almost empty and then filled in new material. The extruded strands were then drawn off over a water bath and comminuted with a granulator (Scheer Reduction Engineering GmbH—model: SGS 25-E4).

Sample B: 50% LLDPE Mixed with 50% Old Powder Paint Residues (Batch 3) Including 2% Stearic Acid The mixing showed a much lower dust load after about 5 minutes of stirring. The powder particles adhered to the LLDPE pellets, which made it possible to produce a more homogeneous mixture. The surface of the pellets looked smooth and shiny. This sample was processed without complications. The mixture looked damp and greasy, the dust pollution accordingly low. The material was drawn into the screw without any problems. The extruded strands were then drawn off over a water bath and comminuted using a granulator (Scheer Reduction Engineering GmbH—model: SGS 25-E4).

The extruded strands of sample A, which consisted of 50% of the hardened powder coating residues (batch 3), showed a high surface roughness. In contrast, the extruded strands of sample B with the addition of stearic acid had a very smooth surface structure.

EXAMPLE 7—MFI MEASUREMENT

To check the melt mass flow rate, a determination of the melt mass flow rate (MFR) and the melt volume flow rate (MVR) of thermoplastics ISO 1133-2: 2011 was carried out. ISO 1133-2: 2011 German version contains the procedures for materials that are sensitive to a time or temperature dependent history and/or moisture.

The melt volume flow rate (MVR) and the melt mass flow rate (MFR) are determined by extruding a molten material from the cylinder of a plastometer through an extrusion die with a specified length and diameter under given conditions of temperature and applied load. The MVR can be converted to the MFR or vice versa if the density of the material is known at the test temperature. The MFR value is defined as the melt index, which indicates the amount of material in grams that flows through a capillary with defined dimensions in ten minutes at a specific weight and temperature:

with MFR=$(m \cdot 600)/t$ with m: mean value of the mass of the sections, t: time interval for the cutting.

Figure 20:
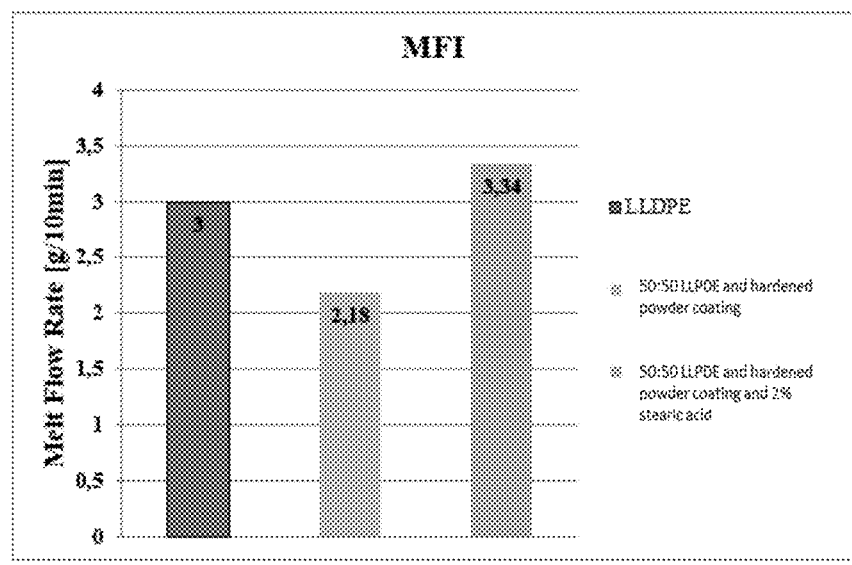
FIG. 20: Comparison of MFR values, LLDPE (sample C) with sample A and sample B.

The following materials were used:
Sample A: 50% LLDPE/50% hardened old powder paint residues (batch 3)
Sample B: 50% LLDPE/50% uncured old powder paint residues (batch 3) including 2% stearic acid
Sample C: pure LLDPE (Low Linear Density Polyethylene) Dowlex SC 2108G The MFR values of samples A, B and C in comparison are shown in FIG. 20.

The melt index of Sample C was 3 g/10 min, i.e. the LLDPE has very good flow properties. According to the data sheet, the LLDPE has a melt index of 2.6 g/10 min. The deviation is due to measurement inaccuracies. A value of 2.18 g/10 min was determined for sample A with 50% LLDPE and 50% hardened old powder coating residues (batch 3). The cause of the poorer flow compared to the pure LLDPE is the mixture proportions of the sample. The hardened thermosets are brittle and closely meshed and have no internal sliding options. The flow behavior is only determined by the LLDPE with the thermoset part as filler.

A value of 3.34 g/10 min was determined for sample B with 50% LLDPE and 50% uncured old powder paint residues (batch 3) including 2% stearic acid. As the MFI increases, the fluidity improves. The better flow properties are the result of stearic acid. In this case, the stearic acid acts as an internal lubricant within the matrix. This internal lubrication of the polymer matrix facilitates the sliding of the polymer chains and reduces the internal shear. In the case of filled thermoplastics, stearic acid not only serves to improve the flow, but also acts as a compatibilizer. It ensures a better connection of fillers or pigments to the polymer matrix. The result is a reduced viscosity and therefore better flow properties.

EXAMPLE 8—PRODUCTION OF THE TEST SPECIMENS BY INJECTION MOLDING

The test specimens according to type 1A of the mentioned standard (DIN EN ISO 527) were carried out using a Boy 30A injection molding machine.

First, the samples in the form of dried granules were placed in the funnel of the injection unit of the injection molding machine. The mixture was melted (plasticized) by friction and simultaneous heating. The temperature and pressure settings were varied for the samples and adjusted accordingly to the parameters.

TABLE 5

Temperature and pressure parameters of the injection molding machine for the samples

| Sample/Mixtures | Injection pressure [bar] | Holding pressure [bar] | Cooling time [s] | Zone 1 [° C.] | Zone 2 [° C.] | Zone 3 [° C.] | Zone 4 [° C.] |
|---|---|---|---|---|---|---|---|
| Sample A: 50% LLDPE with 50% hardened powder coating residues (batch 3) | 80 | 80 for 15 s | 45 | 200 | 210 | 220 | 220 |
| Sample B: 50% LLDPE with 50% old powder paint residues (batch 3) including 2% stearic acid | 90 | 80 for 15 s | 45 | 200 | 210 | 220 | 220 |
| Sample C: LLDPE | 80 | 80 for 25 s | 45 | 220 | 230 | 240 | 240 |

The spraying process is as follows. The melt collects in front of the tip of the retreating screw until the amount is sufficient to fill the tool. The melt is pressed under high injection pressure via a nozzle and the sprue into the shaping cavity of the injection mold. Then the melt in the cavity begins to cool down and shrink (shrink). As this could lead to sink marks, a reduced pressure acts as a hold pressure on the melt until the sprue solidifies and the plasticizing process for the next cycle begins. In the meantime, the tensile test rod cools down until it is finally ejected by pins when the tool is opened. The solidified material, the so-called sprue, which remains in the sprue channel of the mold due to cooling, initially remains on the tensile test rod when the mold is opened and has to be removed subsequently.

100 test specimens per sample type were produced, and the following results were found:

Sample C: LLDPE

There were no problems processing LLDPE. According to the manufacturer's product information, the material could be processed well.

Sample A: 50% LLDPE Mixed with 50% Hardened Old Powder Paint Residues (Batch 3)

In the first tensile test parts after the injection molding process of sample A, sink marks were observed and the tensile test rod was not completely filled with material. The dosage was increased. The sink marks, which were recognizable by indentations (dents) in the surface, especially on the sprue, could be eliminated by increasing the pressure. However, the surface of the tensile test pieces was rough and uneven.

Sample B: 50% LLDPE with 50% Uncured Old Powder Paint Residues (Batch 3) Including 2% Stearic Acid With sample B the dosage and the pressure had to be increased as well, the dosage was higher than with sample A. Slight streaks of color could be observed, which are probably due to insufficient mixing ratios due to the different size ratios of the particles between plastic and filler. The injection speed has been increased and adjusted. The tensile test bars had a smooth, even surface.

EXAMPLE 9—MECHANICAL AND THERMAL PROPERTIES OF THE TEST SPECIMENS: TENSILE TEST

The sample mixtures from Example 7 were compounded by extrusion and then injection molded into test specimens. After the tensile test bars had been produced, they were characterized analytically and mechanically.

The tensile strength and modulus of elasticity were determined in accordance with DIN EN ISO 527 in a standard climate on a universal testing machine from the "Zwick Model 63336/101" company.

Figure 21:
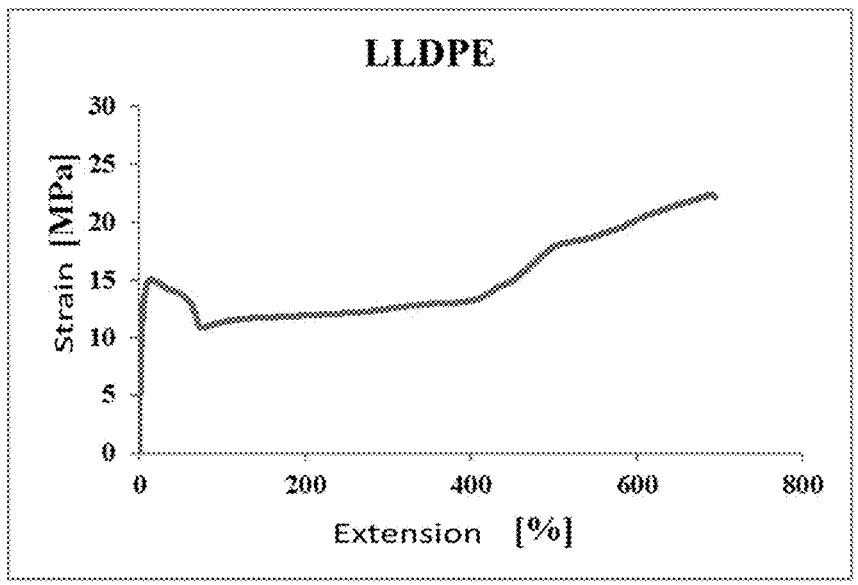
FIG. 21: Curve of LLDPE in the stress-strain diagram

FIG. 21 shows the stress-strain curve. The stress-strain curve is divided into the following sections:

Section 1: At the beginning of the load, LLDPE behaved linearly elastic, i.e. the stretch compared to the initial length is completely elastic again in the initial state when relieved (FIG. 21). The associated material parameter, which describes the linear-elastic deformation behavior, is the modulus of elasticity E.

$$E = \Delta\sigma/\Delta\varepsilon$$

The modulus of elasticity E results from the slope of the stress-strain curve for the two specified strains $\varepsilon_1 = 0.05\%$ and $\varepsilon_2 = 0.25\%$ and the associated tensile stresses 61 and 62 according to:

$$E = \frac{\sigma_2 - \sigma_1}{\varepsilon_2 - \varepsilon_1}$$

Section 2 (directly after the Hooke line)—This is where the LLDPE begins linear viscoelastic range, i.e. when the load is released, the workpiece remains deformed and this deformation is linear to the applied stress σ. This is why this area is also called the linear viscoelastic area.

Section 3 (the first voltage drop)—As in Section 2, there is a deformation of the LLDPE sample when unloaded, only this deformation is much larger than with linear behavior and the curve becomes flatter. This area is also referred to as the necking area and the cross section of the test specimen becomes smaller. The fact that the curve in the stress-strain diagram 6 (E) drops has mechanical causes. The applied force F and thus the tension 6 is measured by a strain gauge on the crossbar. The molecular chains rearrange themselves in the plastic.

Section 4 (100%-400% elongation)—Here the cross-section A of the test specimen continued to decrease. The tension increased again because the molecular chains aligned along the direction of loading and could therefore absorb more force. This area is called stationary plastic flow.

Section 5 (400%-695% elongation)—This area is called the hardening area. In this section, the molecular movement is blocked, so that the tension continues to rise and the material ultimately fails, because due to the solidification, defects (pores and cracks) are created which spread further into the surface. The ultimate break occurred only after the sample had been stretched by strong plastic flow at approx. 700% elongation. The characteristic values of the yield stress and elongation at break could thus be distinguished from the breaking stress and elongation at break. For pure LLDPE, the tensile strength σm is 23.7±1.17 MPa and the modulus of elasticity is 393±86.8 MPa.

Sample A: 50% LLDPE Mixed with 50% Hardened Old Powder Paint Residues (Batch 3)

Figure 22:
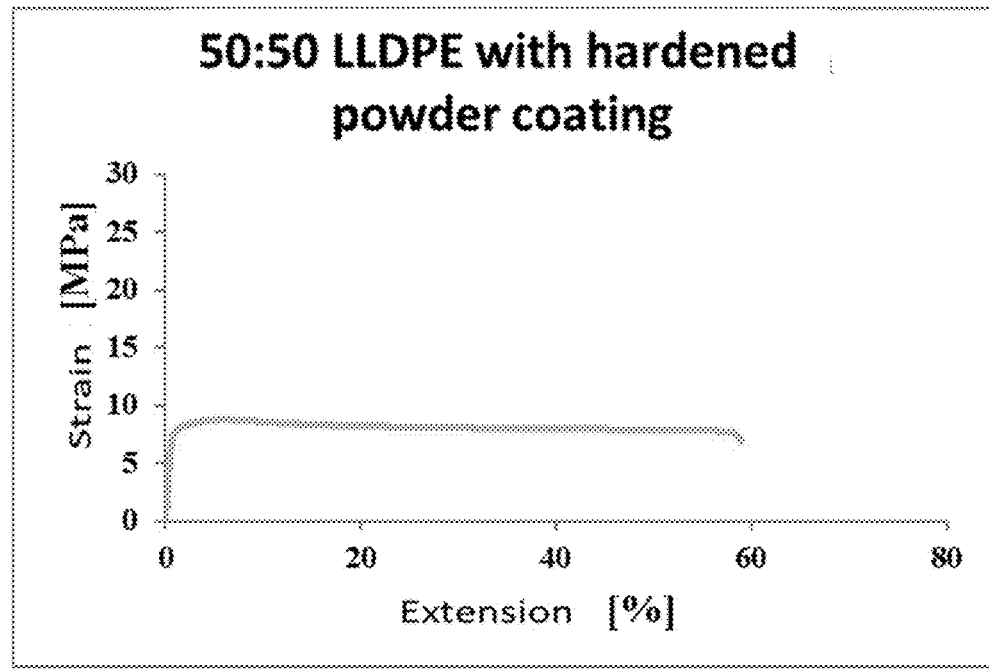
FIG. 22: Curve of sample A in the stress-strain diagram

FIG. 22 shows the stress-strain curve of sample A. The mixture consisted of 50% hardened thermosets and 50% thermoplastic. The thermoset part was declared as a filler. Within the scope of Hooke's law for sample A, stress 6 and strain c are proportional to each other (beginning of the load). However, this is no longer the case at higher voltages. The deviation from linear behavior, which increases with increasing voltage, can be clearly recognized in the stress-strain diagram. With increasing tension, the permanently remaining plastic part of the deformation increases. The tensile stress was increased to the yield point, the material began to deform more plastically. It started to flow—like a viscous liquid. This flow under tension is called a cold flow. If possible, the yield point is given as the upper yield point.

For sample A, the tensile strength σm was 8.72±0.12 MPa and the modulus of elasticity was 965±72.5 MPa. The technical tension decreased continuously after reaching the tensile strength, since the molecular chains of the LLDPE were interfered with in their connection by the powder coating particles in between.

Figure 23:
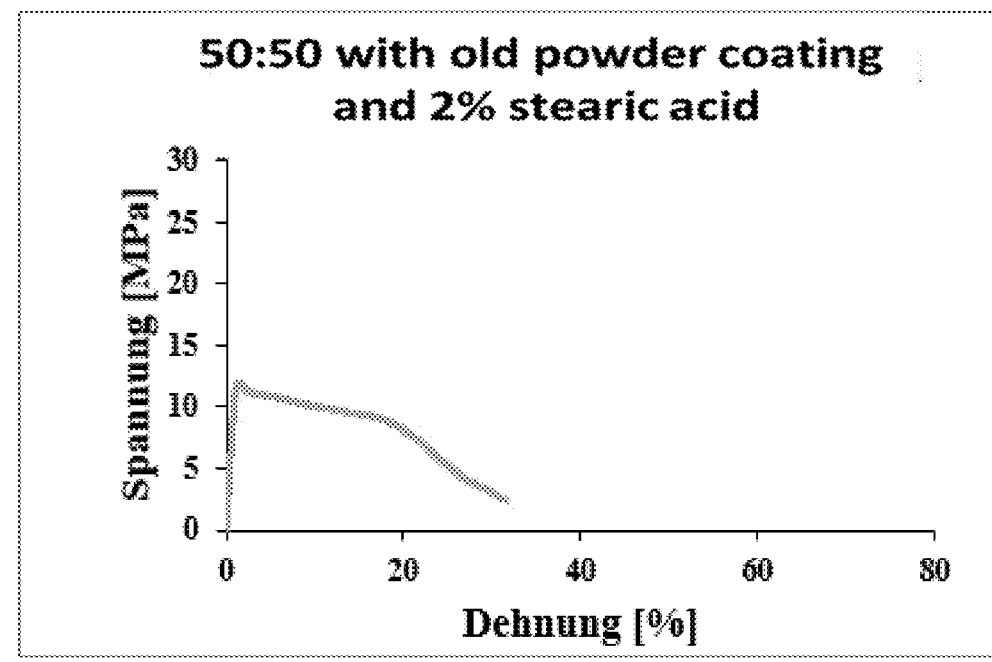
FIG. 23: Curve of sample B in the stress-strain diagram

Sample B: 50% LLDPE with 50% Old Powder Paint Residues (Batch 2) Including 2% Stearic Acid FIG. 23 shows the stress-strain curve of sample B. Sample B consisted of 50% LLDPE, 50% uncured old powder paint residues (batch 2) including 2% stearic acid. The curve initially behaved similarly to sample A and initially showed a linear-elastic behavior, which then fell off continuously. For sample B the tensile strength σm was 10.7±1.33 MPa and the elastic modulus 1010±166 MPa.

EXAMPLE 10—MECHANICAL AND THERMAL PROPERTIES OF THE TEST SPECIMENS: IMPACT TEST

Figure 24:
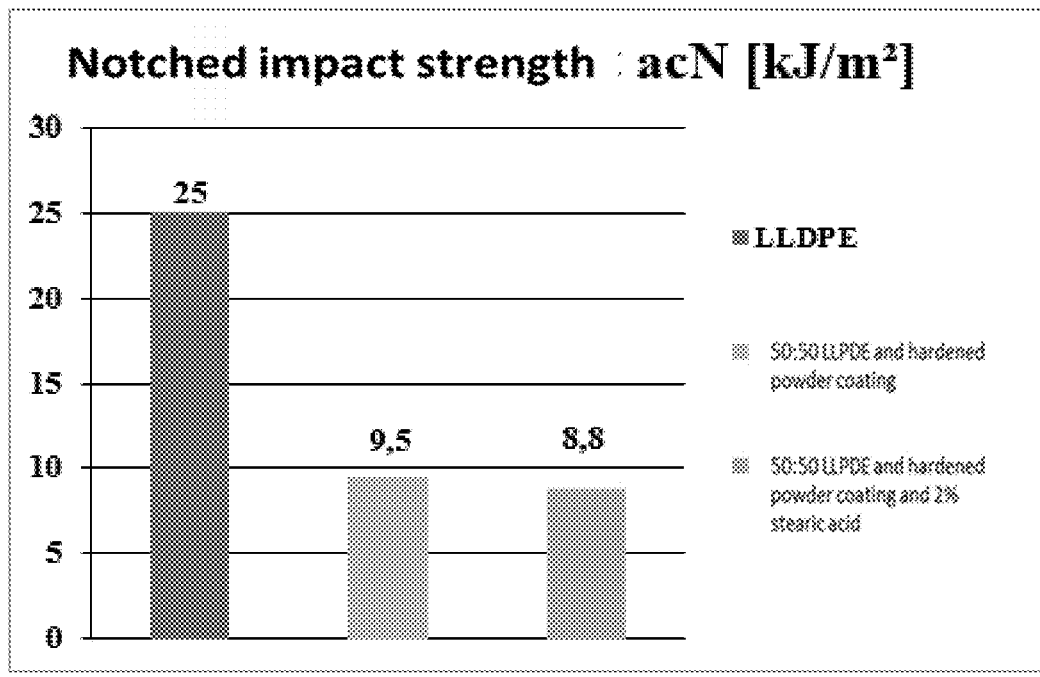
FIG. 24: Measurement data of the notched pendulum test from LLDPE (sample C), sample A and sample B.

This was followed by a "non-instrumented impact test" according to (ISO 179-1: 2010). The results are shown in FIG. 24.

The following materials were used:

Sample A: 50% LLDPE mixed with 50% hardened old powder paint residues (batch 3)

Sample B: 50% LLDPE with 50% uncured old powder paint residues (batch 3) including 2% stearic acid Sample C: pure LLDPE The standardized test specimens were tested in the testing device according to DIN EN ISO 527-2 impact pendulum from Zwick. The result is a toughness characteristic. The impact work ($kJ/m^2$) related to the smallest cross-section of the specimen up to the break is determined.

A value of 25±0.144 $kJ/m^2$ was found for sample C made of pure LLDPE, i.e. the mechanical resilience is high. Not all samples at the LLDPE are broken. Sample A had a value of 9.9±0.615 $kJ/m^2$ and sample B had a value of 8.8±0.717 $kJ/m^2$.

The impact resistance values of samples A and B are over 50% lower than that of pure LLDPE. It is striking that the characteristic values of sample A and sample B are relatively close together, whereby sample B has a lower load capacity than sample A.

In addition to determining the characteristic value, it is also important to consider the fracture surface. The material behavior can only be inferred from the evaluation of both information. Knowledge of the actual fracture behavior of the plastics used is essential for the correct design of the components. A distinction is made between two types of overload fracture: ductile fracture and brittle fracture.

If there is no discoloration of white on a flat fracture surface, a brittle fracture takes place without any significant plastic deformation. Fractures with a high proportion of plastic deformation, i.e. ductile fractures, can be recognized by a pronounced white discoloration on the fracture surface. The visual fracture surface evaluation of samples A and B suggests a mixed form of ductile and brittle fracture.

Figure 25:
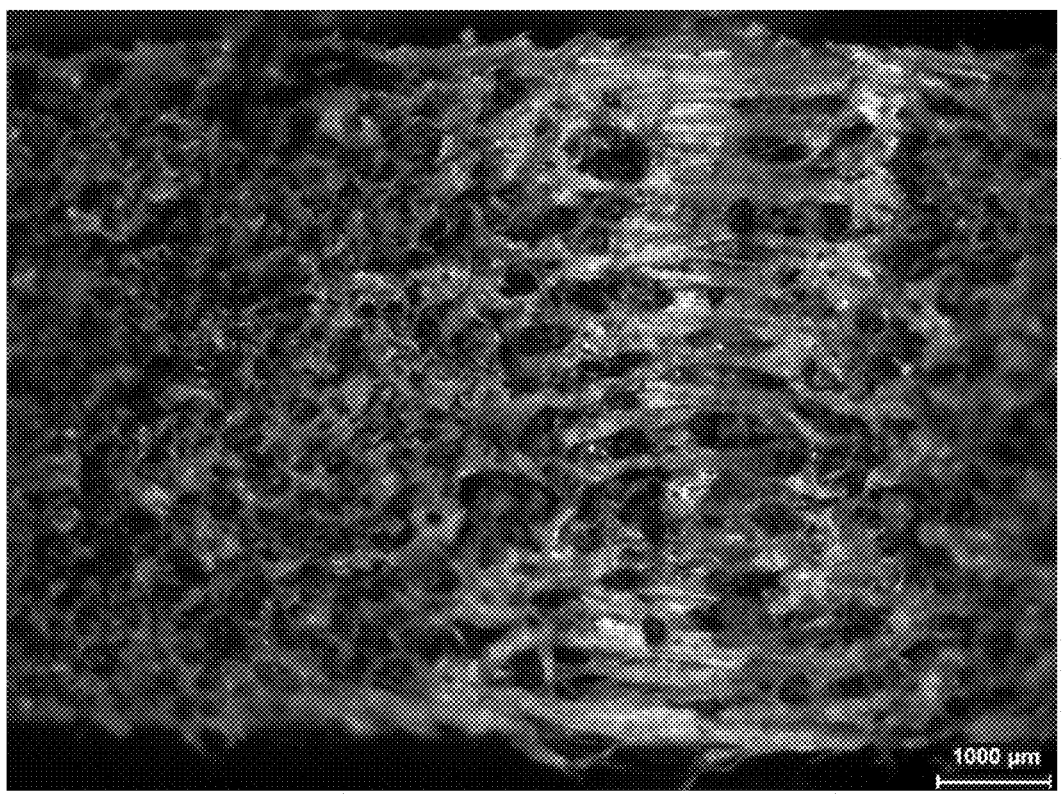
FIG. 25: Fracture surface of a notched impact sample from sample A (magnified 10 times). Image taken with a Leica microscope.

The microscopic micrograph of sample A in FIG. 25 shows a separation between the powder coating particles (black angular particles) and the LLDPE (fibrous matrix). Both components are available without a recognizable composite material.

Figure 26:
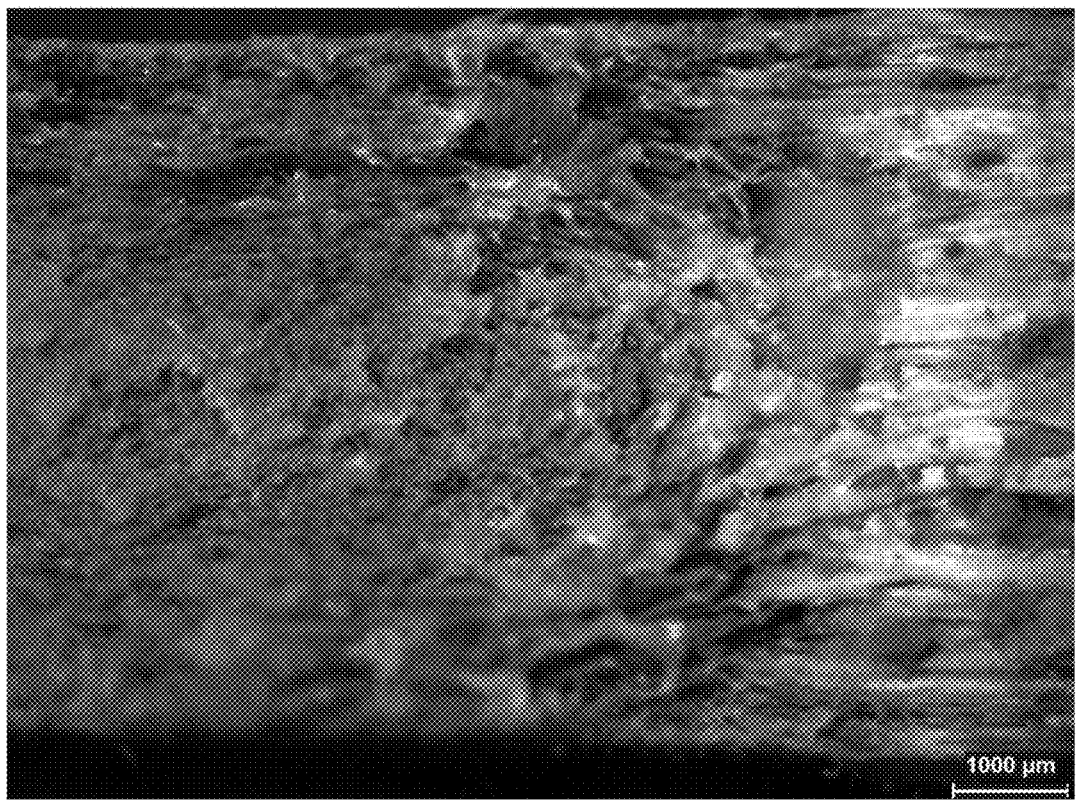
FIG. 26: Fracture surface of a notched bar impact sample of sample B (enlarged 10 times) Image taken with a Leica microscope

Sample B in FIG. 26 shows a more homogeneous structure than sample A. It is characterized by a uniform fibrous structure. The individual components can no longer be distinguished from one another. As a source of error, it can be stated that impact resistance strengths react very strongly to wanted and unwanted modifications of the samples or to influences, such as processing parameters in the manufacture of the samples, notch geometry or test temperature.

EXAMPLE 11—SCANNING ELECTRON MICROSCOPIC EXAMINATIONS OF THE TEST SPECIMENS

For the SEM investigations, tensile test bars produced by injection molding in accordance with DIN EN ISO 527 with the following composition were used as samples:

Sample A: 50% LLDPE with 50% hardened old powder paint residues (batch 3)

Sample B: 50% LLDPE with 50% uncured old powder paint residues (batch 3) including 2% stearic acid Sample C: Pure LLDPE Dowlex SC 2108G Sample D: uncured old powder paint residues (batch 3) including 2% stearic acid The samples were prepared and carried out after materialograhic cross-section preparation. The samples are placed individually or in groups in an embedding mold and poured with a cold embedding agent. After a few minutes, the curing process begins with the development of heat. After cooling, the samples could be processed further. Fine bumps were first removed using a diamond suspension with a diameter of 6 μm-15 μm. This was followed by a fine polishing with a grain diameter of 3 μm-1 μm. The samples were rotated 90° again and again to avoid polishing flags. After polishing, the cuts were thoroughly cleaned under running water, rubbed with a cotton ball and dried with a hair dryer.

First, a SEM picture of pure LLDPE was considered.

Figure 27:
FIG. 27: SEM image of pure LLDPE

FIG. 27 shows a SEM image of the cross section of a tensile test rod manufactured by injection molding in accordance with DIN EN ISO 527 in a standard climate of LLDPE. The surface of LLDPE represents 'scale-like' fracture areas that run from right to left. A broken surface is particularly well visible in the top right of the picture.

SEM images of sample A 50% LLDPE with 50% hardened old powder paint residues (lot 3) and sample B 50% LLDPE with 50% uncured old powder paint residues (lot 3) including 2% stearic acid were then examined The tensile test rod manufactured by injection molding in accordance with DIN EN ISO 527 (see FIG. 28a) clearly shows the separation in cross-section of the sample between LLDPE and the filler from hardened old powder paint residues (batch 3).

LLDPE is partially arranged in a fiber-like manner in all directions or in the form of a sheet in partial areas in the matrix. The hardened powder particles are stored in between. No connection between the two materials can be seen. Cavities are visible within the matrix, which could be due to air pockets or fractured surfaces. The image in FIG. 26 shows a closed, uniform surface on the surface. There is no direct separation between the powder particles and LLDPE. The powder particles are embedded in the matrix and are enveloped by stearic acid. A few cavities and depressions are visible that could be traced back to air pockets, fracture surfaces or locations.

Figure 28:
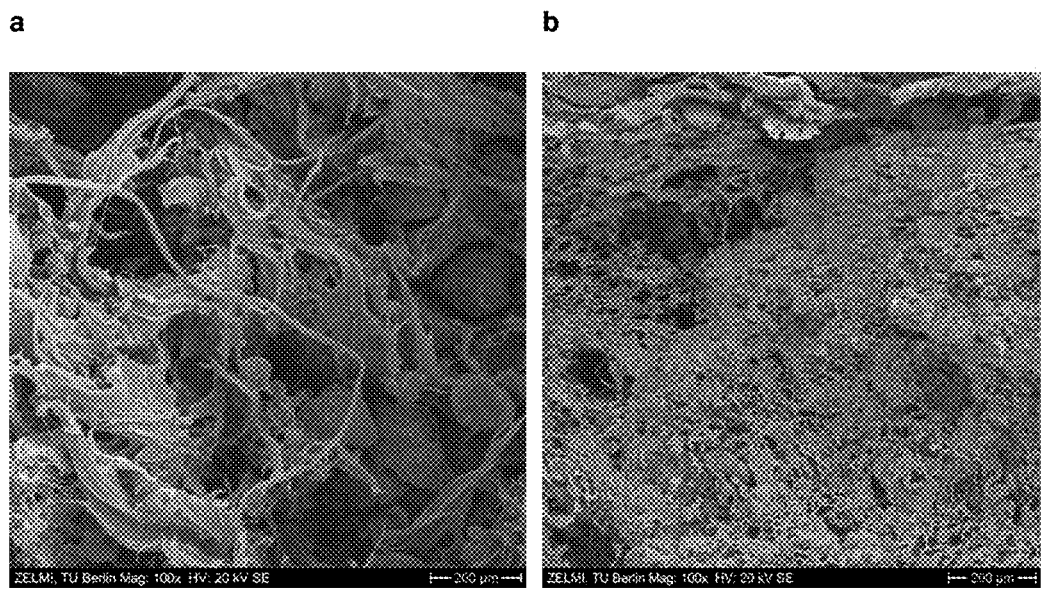
FIG. 28: a) SEM image of sample A, 50% LLDPE with 50% hardened old powder paint residues (batch 3). 2000× magnification b) SEM picture of sample B, 50% LLDPE with 50% uncured old powder paint residues (batch 3) including 2% stearic acid. 2000× magnification

Since the matrix in FIG. 28b of sample B has a more uniform distribution and connection within the particles than sample A in FIG. 28a, it would be expected that the adhesive properties between the individual mixture components of sample B with 50% LLDPE and 50% uncured old powder paint residues (Batch 3) including 2% stearic acid are more pronounced.

Figure 29:
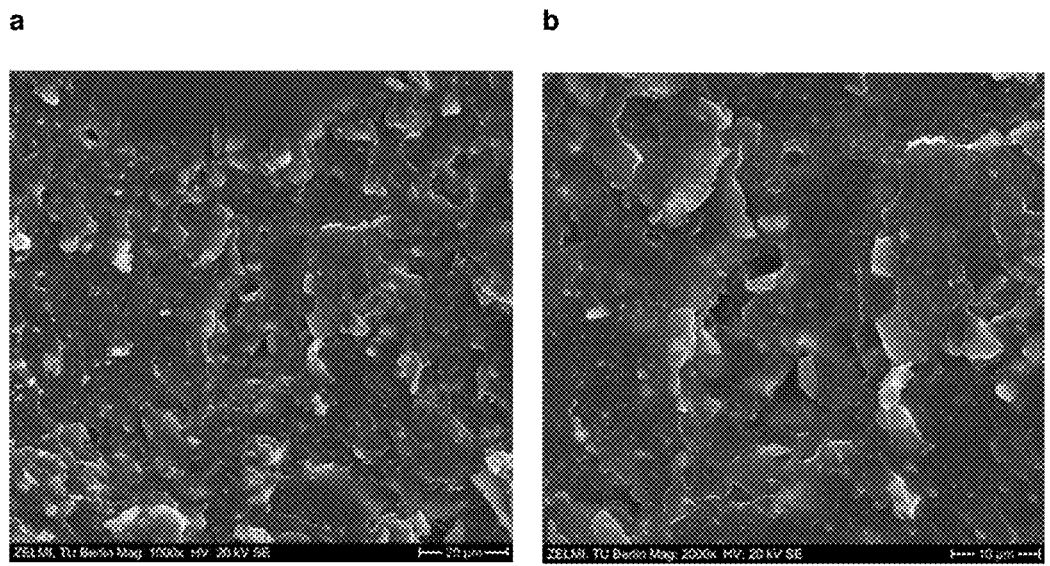
FIG. 29: a) SEM image of sample B made from uncured old powder paint residues (batch 3) including 2% stearic acid. 1000× magnification b) SEM image of sample B from uncured old powder paint residues (batch 3) including 2% stearic acid. 2000× magnification

Subsequent SEM images of sample B made from uncured old powder paint residues (batch 3) including 2% stearic acid (FIG. 29).

In FIGS. 29a and 29b, waste powder paint residues (batch 3) were mixed with 2% stearic acid and cured on a metal plate in an oven at 200° C. for 5 minutes. The cured coating was easily removed from the metal plate. The particles (white coated particles) are enveloped by the stearic acid. The surface has no depressions or massive voids. The stearic acid fills the surface gaps due to its waxy structure and its flow behavior when hardened. The mixture is completely covered with a layer.

In FIGS. 29a and 29b, which show uncured old powder paint residues (batch 3) with 2% stearic acid, it can be clearly seen that the stearic acid has formed a uniform surface matrix and thus represents the best result with regards to a uniform coating. Since the best result of the test series could be achieved with stearic acid, the SEM images in FIGS. 29a and 29b support the finding of stearic acid as a 'lubricant'.

EXAMPLE 12—FTIR SPECTROSCOPY OF THE TEST SPECIMENS

For the FTIR investigations, tensile test bars produced by injection molding according to DIN EN ISO 527 with the following composition were used as samples:
Sample A: 50% LLDPE with 50% hardened old powder paint residues (batch 3) (FIG. 31)
Sample B: 50% LLDPE with 50% uncured old powder paint residues (batch 3) including 2% stearic acid (FIG. 32)
Sample C: Pure LLDPE Dowlex SC 2108G (FIG. 30)

Figure 30:
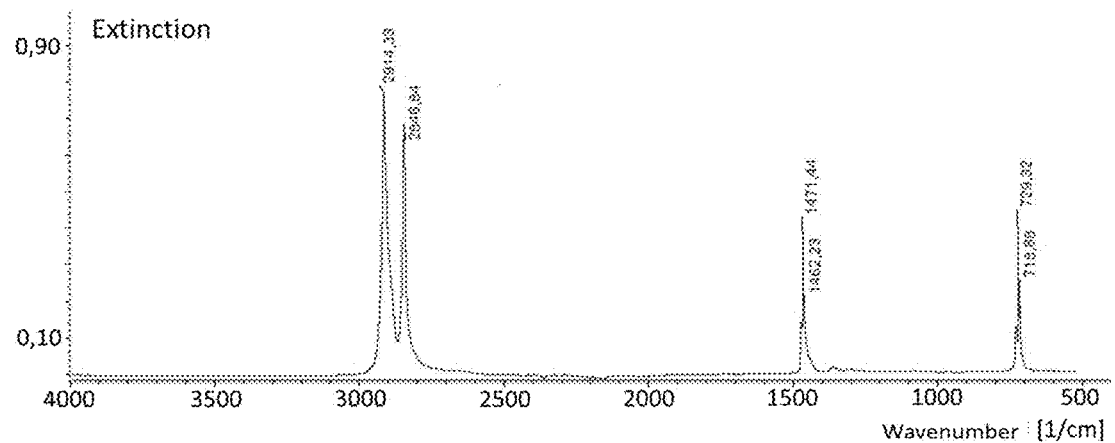
FIG. 30: FTIR image of pure LLDPE (sample C)
Figure 31:
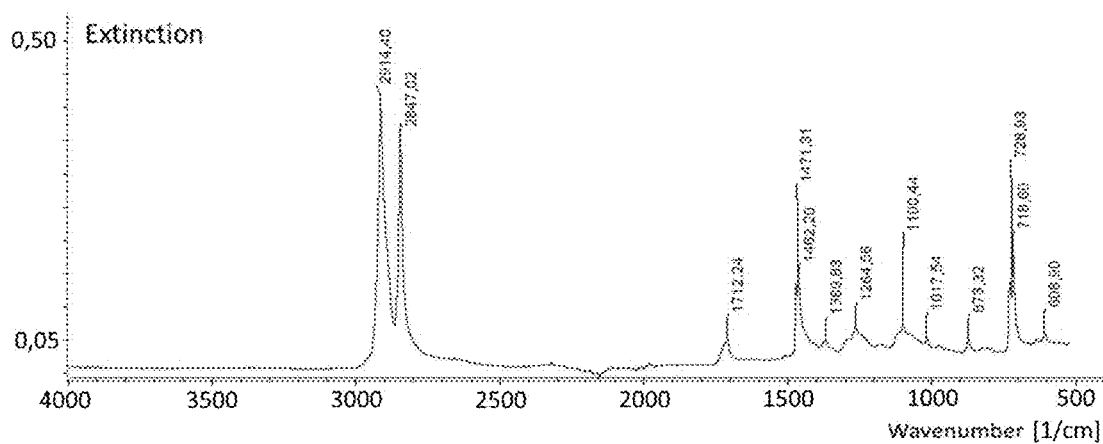
FIG. 31: FTIR image of sample A, 50% LLDPE with 50% hardened old powder paint residues (batch 3)
Figure 32:
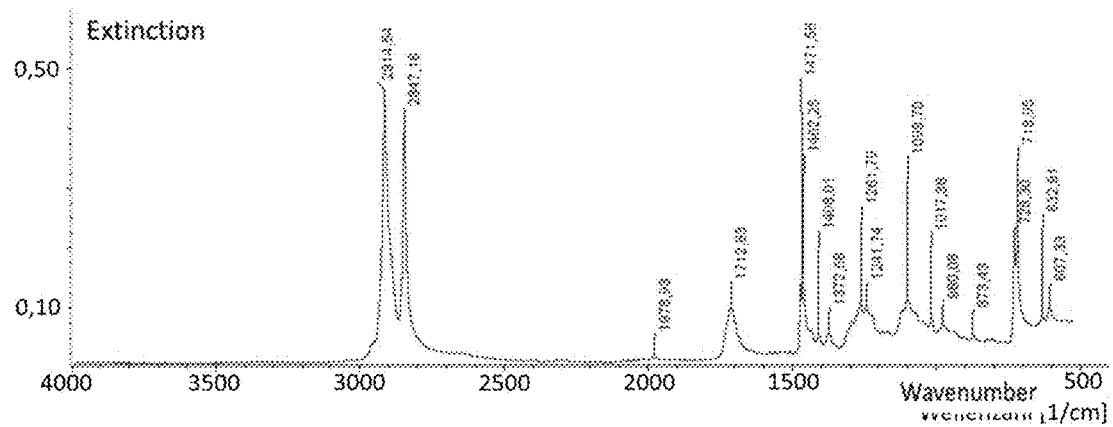
FIG. 32: FTIR image of sample B, 50% LLDPE with 50% uncured old powder varnish residues (batch 3) including 2% stearic acid

The FTIR measurements performed on pure LLDPE, 50% LLDPE with 50% hardened old powder paint residues (batch 3) and 50% LLDPE with 50% uncured old powder paint residues (batch 3) including 2% stearic acid are shown in FIGS. 30-32.

The FTIR spectrum for pure LLDPE is first evaluated. The following absorption bands could be assigned:
Saturated hydrocarbon residues (—CH3 and CH2 valence vibrations) were identified at the wave number 2914 cm$^{-1}$. The vibration bands between 718 cm-729 cm$^{-1}$ and at 1462 cm$^{-1}$-1471 cm$^{-1}$ correspond to the wave numbers of methyl groups and methylene groups. FIG. 30 shows absorption bands that match the literature values.

The FTIR spectrum for pure LLDPE is first evaluated. The following absorption bands could be assigned:
Saturated hydrocarbon residues (—CH$_3$ and CH$_2$ valence vibrations) were identified at the wave number 2914 cm$^{-1}$. The vibration bands between 718 cm$^{-1}$-729 cm$^{-1}$ and at 1462 cm$^{-1}$-1471 cm$^{-1}$ correspond to the wave numbers of methyl groups and methylene groups. FIG. 30 shows absorption bands that match the literature values.

In FTIR recording of sample A FIG. 31, 2914 cm$^{-1}$ saturated hydrocarbon residues (—CH$_3$ and CH$_2$ valence vibrations) were identified at the wave number. The vibration bands recorded at 718 cm$^{-1}$-728 cm$^{-1}$ and 1462 cm$^{-1}$-1471 cm$^{-1}$ also correspond to the wave numbers of methyl groups and methylene groups and demonstrably indicate LLDPE.

In addition, the following connection classes of the cured old powder paint residues (batch 3) could be identified and assigned. At 1264 cm$^{-1}$ ether groups could be recognized, at 873 cm$^{-1}$ epoxides. The corresponding hardener groups of the amides are visible at the wave number 1369 cm$^{-1}$. They can be attributed to reactions of the epoxies with modified dicyandiamide.

The wavenumbers 1712 cm$^{-1}$ indicate carboxylic acids. The presence of the amides and the detection of the ester groups at 1100 cm$^{-1}$ make it likely that polyester resins will crosslink with hydroxyalkyl amide hardeners to form an ester amide.

FIG. 32 of sample B also shows the corresponding methyl and methylene groups of LLDPE and the resulting reaction products between resin and hardener as in FIG. 31.

Due to the stearic acid, which participates in the cross-linking reactions, visible changes in the intensities occur in sample B FIG. 32. The intensities of the peaks at the wave numbers 1261 cm$^{-1}$ and 1241 cm$^{-1}$, which belong to the ester compounds, are demonstrably wider and more pronounced. A finding that indicates increased or increased crosslinking of polyester resins with hydroxyalkyl amide hardeners to give ester amides. The intensity of the peak at the wavelength 1712 cm$^{-1}$ is significantly higher. A newly formed peak at 980 cm$^{-1}$ was also identified as carboxylic acid and indicates the remaining stearic acid, which was not involved in the reactions with the old powder coating residues (batch 3).

LLDPE Dowlex SC 2108G and stearic acid can be seen in the FTIR spectrum and could be detected in the cured old powder paint residues (batch 3).

EXAMPLE 13—DSC MEASUREMENTS OF THE TEST SPECIMENS

For the tests carried out with the Mettler Toledo DSC 822, injection molded tensile test bars according to DIN EN ISO 527 with the following composition were used as samples:
Sample A: 50% LLDPE with 50% hardened old powder paint residues (batch 3) (FIG. 34)
Sample B: 50% LLDPE with 50% uncured old powder paint residues (batch 3) including 2% stearic acid (FIG. 35)
Sample C: Pure LLDPE Dowlex SC 2108G (FIG. 33)

First, a DSC measurement of pure LLDPE was carried out. The heating rate for the measurements is fixed at 20 K/min The measuring range is limited to 25° C.-250° C.

Figure 33:
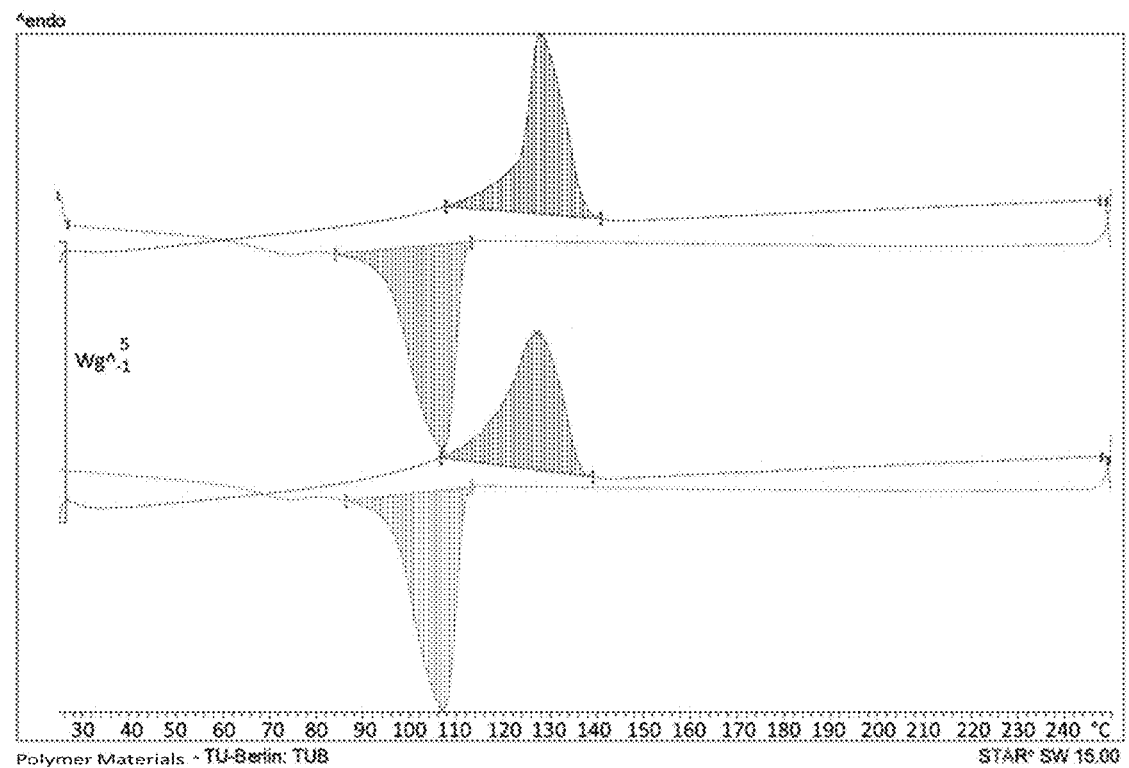
FIG. 33: DSC measurements of pure LLDPE (sample C)

In FIG. 33, the DSC curve of pure LLDPE shows a clear endothermic melting peak at approx. 130° C. (black curve) when heated up for the first time. During the second heating (blue curve) the endothermic reaction peak is shifted slightly to the left and a pronounced melting peak at approx. 127° C. can be seen. When cooling (red and green curves), the crystallization behavior of pure LLDP can be clearly seen. Here you can find the crystallization temperature at around 110° C.

Figure 34:
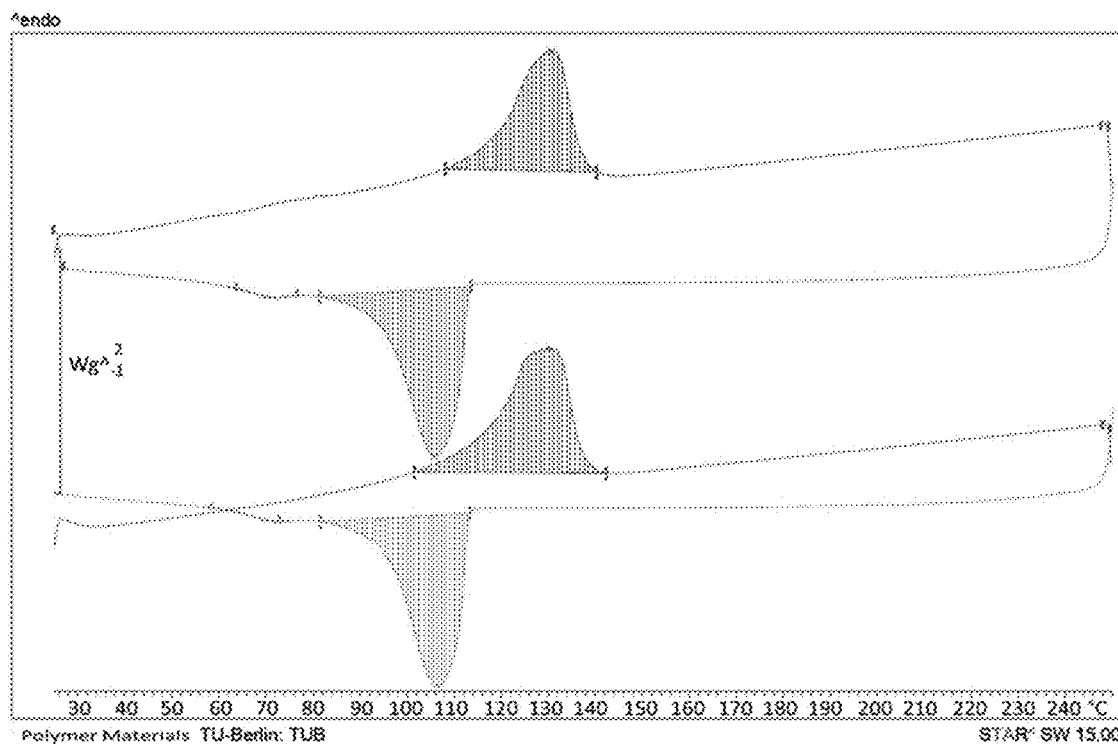
FIG. 34: DSC measurements of sample A, 50% LLDPE with 50% hardened old powder paint residues (batch 3)
Figures 35, 36:
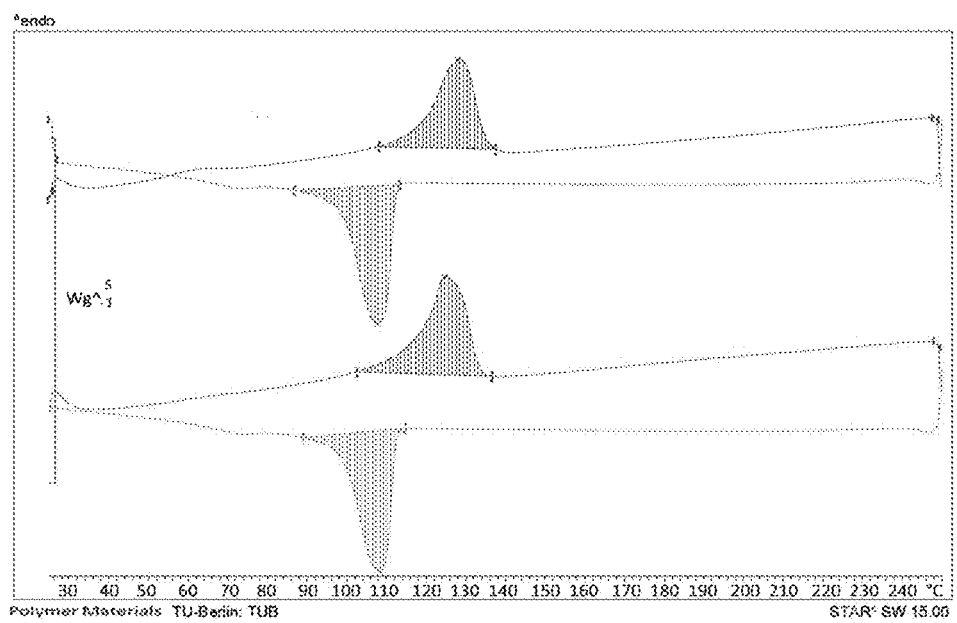
FIG. 35: DSC measurements of sample B, 50% LLDPE with 50% uncured old powder paint residues (batch 3) including 2% stearic acid
FIG. 36: Overview of the classification of surfactants EXAMPLE 1: SUITABILITY OF VARIOUS REACTANTS FOR REMOVING THE METAL ADHESION OF POWDER COATING WASTE In order to test the suitability for chemical inactivation of functional groups in powder coatings, a series of tests with different reactants was carried out. After the series of dilutions of the chemical compounds (reactants) had been prepared, 2 g of pure powder lacquer types consisting of epoxy, polyester and hybrid powder lacquer were weighed out individually and mixed with 10 ml of the different mixture solutions in small plastic containers using spatulas.

FIG. 34 shows the DSC curve of sample A from the mixture of 50% LLDPE 50% hardened old powder paint residues (batch 3) when heated for the first time a clear endothermic melting peak at approx. 124° C. (black curve). The second, heating (blue curve) shows the pronounced, broader endothermic melting peak at approx. 122° C. When cooling (red and green curves), the crystallization behavior, attributable to LLDPE, can be clearly determined. Here you can find the crystallization temperature in both curves at around 108° C.

The mixture of sample B from 50% LLDPE with 50% uncured old powder paint residues (batch 3) including 2% stearic acid shows an endothermic melting peak at approx. 128° C. (black curve) in the first heating and is therefore 4° C. higher than sample A, which contains no stearic acid. The endothermic melting peak of the second heating (blue curve) is also 4° C. higher than for sample A, which, shifted slightly to the left, is 126° C. The crystallization peak, visible on the narrower red and green cooling curves, identified at 106° C., is two degrees lower than in FIG. 34.

Since stearic acid has been shown to participate in the crosslinking reactions of the powder coatings, it would be conceivable that the enthalpy would increase, i.e. heat was released from the reacting resin, increasing the enthalpy of reaction, which could be the cause of the increase in melting peaks Examples 14-18 relate to various treatments for powder coating waste in recycling processes.

EXAMPLE 14—EXTRUSION OF POWDER COATING WASTE (100% POWDER COATING) AND SUBSEQUENT INJECTION MOLDING

The powder coating waste delivered is transported to the extruder opening in a closed conveyor system Immediately before filling the extruder, the powder coating is mixed with 5% nonadecanoic acid powder.

The extruder temperature is 90° C. The resulting plastic strands (plastic filaments) are then processed into granules.

The granulate produced in this way can be melted down again for an injection molding process (inkjet molding). The temperatures during injection molding are 220° C.

The injection molded material is then available as a thermoset plastic.

EXAMPLE 15—EXTRUSION OF A MIXTURE OF 45% POLYPROPYLENE (PP) AND 50% POWDER COATING WASTE AND SUBSEQUENT INJECTION MOLDING

The powder coating supplied is first mixed in a closed system with 5% hexadecanoic acid and 45% polypropylene pellets. The mix is conveyed into the extruder. The extruder temperature is 200° C. The resulting plastic strands are then processed into granules.

The granulate produced in this way can be melted down again for an injection molding process (inkjet molding). The temperatures during injection molding are 210° C.

The injection molded material is then available as a filled thermoplastic.

EXAMPLE 16—FUSED DEPOSITION MODELING (FDM) WITH FILAMENTS MADE FROM RECYCLED POWDER COATING

First, plastic filaments are produced in a process as described under 1).

These plastic filaments serve as the starting material for 3D printing using the FDM method. Since the plastic filament made from recycled powder coating waste (or from commercially available powder coating) melts at a very low viscosity, it is possible to use a special form of FDM with this material—instead of a strand of material that is deposited by the printer head, the material can be deposited drop by drop Piezo printer head done. The advantage of this processing method is the much higher resolution of 3D printing.

The processing temperature in the printer head is 210° C. The resulting 3D print is then available as a thermoset plastic. Post-crosslinking takes place by sintering at 210° C. for 10 minutes.

EXAMPLE 17—FUSED DEPOSITION MODELING (FDM) WITH FILAMENTS MADE FROM RECYCLED POWDER COATING AND METAL PARTICLES

First, the plastic filaments are produced in a process similar to that described under 1). The powder coating is mixed with 3% dodecanoic acid before filling the extruder. The temperature in the extruder is 80° C. The resulting filaments are then used as the starting material for a special variant of FDM printing:

It is a printing variant in which a droplet of material is not deposited as described under 3). The processing temperature in the printer head is 220° C. In front of the printer head is an area in which two material flows are combined—the plastic strand and the steel filaments, which are aligned in the longitudinal direction by a coil. Since the melted powder coating is very low-viscosity, it can easily penetrate the spaces between the steel filaments by pressure. The mixture is fed through the print head. After the printing process, the direction of the steel filament can be subsequently adjusted to the new direction by another magnetic field on the printer head when the direction changes in the still liquid plastic.

The agent is deactivated by post-sintering at 200° C. for 15 minutes and metal adhesion occurs.

EXAMPLE 18—SELECTIVE LASER SINTERING (SLS)

For an SLS process with a modified powder coating waste, this is mixed with 4% 1-tetracosanol powder and deposited in the SLS reaction bed. It has been shown that laser sintering without agents creates relatively porous structures. By adding one of the agent molecules described above, the structures could be largely smoothed and apparent secretion processes between individual particles could be reduced. After laser sintering is complete, the printed 3D body is sintered for 10 minutes at 220° C.

The invention claimed is:

1. A process for recycling powder coating waste comprising:
    a) providing of a solvent-free and powdery powder coating waste;
    b) providing a reactant; and
    c) mixing the powder coating waste with the reactant in order to obtain a further processable reactant-powder coating waste mixture
characterized in that
the reactant is a surfactant, wherein the powder coating waste has functional groups which can mediate adhesion to a metal surface and the reactant inactivates the functional groups by chemical reaction, wherein the reactant has a melting temperature of at least 50° C.

2. The process according to claim 1 characterized in that the reactant is a saturated carboxylic acid.

3. The process according to claim 1 characterized in that the reactant is a stearic acid.

4. The process according to claim 1 characterized in that the reactant is a polyethylene glycol (PEG).

5. The process according to claim 1 characterized in that further processing of the reactant powder coating waste mixture takes place at a temperature of at least 60° C.

6. The process according to claim 1 characterized in that the powder coating waste includes thermoset powder coatings.

7. The process according to claim 1 characterized in that the powder coating waste comprises a synthetic resin.

8. The process according to claim 1 characterized in that the functional groups are selected from the group consisting of hydroxyl, epoxy, carboxyl, amino and ester.

9. The process according to claim 1 characterized in that the reactant powder coating waste mixture from c) comprises
i) 90-99.5% by weight of the powder coating waste and
ii) 0.5-10% by weight of the reactant,
wherein the % by weight refer to the total weight of the reactant powder coating waste mixture and are less than or equal to 100 % by weight.

10. The process according to claim 1 characterized in that in the case of further processing of the reactant powder coating waste mixture from c) the mixture is at least partially in contact with a metal surface.

11. The process according to claim 1 characterized in that the reactant powder coating waste mixture from c) is further processed in an extruder and / or an injection molding machine.

12. The process according to claim 1 characterized in that further processing of the reactant powder coating waste mixture from c) is carried out in an extruder in order to obtain plastic strands which are subsequently processed into granules.

13. The process according to claim 1, wherein the reactant is in a powder form.

14. The process according to claim 1, wherein the chemical reaction is an acidic hydrolysis of a nitrile, esterification of a carboxyl group, nucleophilic or electrophilic ring opening of an epoxy group, anhydride formation, amide formation or ester hydrolysis.

15. The process according to claim 2, wherein the saturated carboxylic acid is a saturated fatty acid.

16. The process according to claim 15, wherein the saturated fatty acid is a fatty acid with the empirical formula $C_nH_{2n+1}COOH$ and n=5–30.

17. The process according to claim 7 characterized in that the synthetic resin is an epoxy resin, a polyester resin and / or an acrylic resin or mixtures thereof.

* * * * *